United States Patent [19]

Hara et al.

[11] 4,251,649

[45] Feb. 17, 1981

[54] HEAT-CURABLE AND SOLVENT-SOLUBLE ESTER GROUP-CONTAINING POLYMER COMPOSITIONS AND PROCESS FOR THEIR PREPARATION

[75] Inventors: Shigeyoshi Hara; Tateyoshi Yamada, both of Hino, Japan

[73] Assignee: Teijin Limited, Osaka, Japan

[21] Appl. No.: 894,006

[22] Filed: Apr. 6, 1978

Related U.S. Application Data

[62] Division of Ser. No. 593,644, Jul. 7, 1975, Pat. No. 4,137,221.

[30] Foreign Application Priority Data

Jul. 11, 1974 [JP] Japan .................................. 49-78672
Sep. 30, 1974 [JP] Japan .................................. 49-111649

[51] Int. Cl.$^3$ ............................................. C08L 67/02
[52] U.S. Cl. .................................... 525/439; 260/2.3; 525/58; 525/440; 525/437; 528/45; 528/68; 528/80; 528/85; 528/288; 528/309
[58] Field of Search ................ 260/2.3; 528/288, 309, 528/273, 45, 68, 80, 85; 525/58, 439, 440

[56] References Cited

U.S. PATENT DOCUMENTS

| | | | |
|---|---|---|---|
| 2,921,828 | 1/1960 | Caldwell | 528/309 X |
| 3,444,141 | 5/1969 | Shima | 528/293 |
| 3,446,758 | 5/1969 | Wiener | 260/2.3 |
| 3,453,240 | 7/1969 | Plaster et al. | 528/273 |
| 3,699,082 | 10/1972 | Koerner et al. | 528/47 X |
| 3,752,866 | 8/1973 | Doerk | 260/860 |
| 3,778,410 | 12/1973 | Kuhfuss et al. | 528/273 |
| 3,928,253 | 12/1975 | Thornton et al. | 260/2.3 |
| 3,951,886 | 4/1976 | Miyake et al. | 260/2.3 |
| 3,991,034 | 11/1976 | Takeo et al. | 528/288 X |

FOREIGN PATENT DOCUMENTS 2506774 8/1975 Fed. Rep. of Germany ........... 528/273

*Primary Examiner*—Wilbert J. Briggs, Sr.
*Attorney, Agent, or Firm*—Sherman & Shalloway

[57] ABSTRACT

A heat-curable and solvent-soluble ester group containing polymer composition is prepared by the steps of:

(1) either (i) reacting a highly polymerized linear aromatic polyester with a diaryl carbonate to depolymerize it to a solvent-soluble low-molecular-weight polyester (component A) containing terminal aryl carboxylate groups, or (ii) effecting the above depolymerization in the presence of a compound containing at least two specified functional groups thereby to form a modified solvent-soluble low-molecular-weight polyester (component A') containing terminal aryl carboxylate groups; and (2) either (i) mixing the resulting component A or A' with a monomeric or solvent-soluble polymeric, polyfunctional compound (component B) containing at least two hydroxyl and/or primary or secondary amino groups or (ii) partially reacting the resulting component A or A' with the component B. The composition has superior workability in molding and curing, and gives cured molded products of high utilitarian value. It is especially suitable for use in wire enamelling varnishes.

2 Claims, No Drawings

HEAT-CURABLE AND SOLVENT-SOLUBLE ESTER GROUP-CONTAINING POLYMER COMPOSITIONS AND PROCESS FOR THEIR PREPARATION

This is a division of application Ser. No. 593,644, filed July 7, 1975, now U.S. Pat. No. 4,137,221.

This invention relates to a process for producing heat-curable and solvent-soluble carboxylate ester-containing polymer compositions using thermoplastic linear aromatic polyesters, such as highly polymerized ethylene terephthalate polymers, especially their scraps or wastes, which have recently been manufactured in great quantities. The invention also relates to heat-curable and solvent-soluble polymer compositions produced by such a process, and to a liquid composition comprising a solution of the above polymer composition in a solvent.

Linear aromatic polyesters, such as polyethylene terephthalate polymers, have been known to be useful polymers which can find a wide range of applications as fibers, films and other fabricated articles. These linear aromatic polyesters yield great quantities of scraps or wastes before they are put to end uses after having been formed into fibers, films and other fabricated articles, post-treated (for example, stretched or heat-treated) to impart the desired physical or chemical properties to the fabricated articles, or subjected to processing steps such as texturing or modified yarn making, wound up on a package, or cut to the desired sizes and forms. These scraps and waste products also occur from linear aromatic polyester products finished in the final forms, for example, worn-out garments made of these products, or used polyester photographic films from which silver halides have been recovered. As is well known in the art, the production of shaped articles from polyethylene terephthalate or modified ethylene terephthalate polymers has recently amounted to huge tonnage, and accordingly, the quantities of such scrap or waste polyesters have also become very great.

In order to recover useful components from the scrap or waste polyesters, the following methods have, for example, been used heretofore.

(1) A method for recovering dimethyl terephthalate by reacting the polyester with methanol to depolymerize it.

(2) A method for obtaining bis-($\beta$-hydroxyethyl)-terephthalate or its low condensate by reacting the polyester with ethylene glycol to depolymerize it.

(3) A method comprising reacting the polyester with an alcohol other than ethylene glycol, such as butylene glycol, to depolymerize it, and to form a low-polymerized ester containing another glycol component.

However, all of these methods require considerable costs for depolymerization, and the resulting depolymerized products are of poor quality. Furthermore, these methods only result in returning the polyester to its starting components or their analogous components, and do not contribute anything to imparting new useful characteristics to the polyester. Accordingly, the benefit of these methods is not so attractive.

Accordingly, it is an object of this invention to provide a process for converting a linear aromatic polyester to a different heat-curable and solvent-soluble polymer composition.

Another object of this invention is to provide a process for preparing a heat-curable liquid resin composition, which comprises reacting the above aromatic polyester with a diaryl carbonate to depolymerize it and to form a highly reactive solvent-soluble low-molecular-weight polyester in which at least some amount of its terminal groups are composed of aryl carboxylate groups, and forming the heat-curable liquid composition using the resulting polyester as its useful component.

Still another object of this invention is to provide a novel heat-curable polymer composition prepared by the above process, and its heat-cured products.

Other objects and advantages of this invention will become apparent from the following description.

The above objects and advantages can be achieved in accordance with the present invention by a process for producing a heat-curable and solvent-soluble ester group-containing polymer composition, which comprises (1) reacting a highly polymerized linear aromatic polyester (component 1) with 5 to 95 mole %, based on the total moles of the dibasic acid contained in the polyester, of a diaryl carbonate (component 2) at a temperature of, for example, 100° to 300° C. to depolymerize it and to form a solvent-soluble low-molecular-weight polyester (component A) in which at least 30 mole% of the entire terminal groups are aryl carboxylate groups; or effecting the above depolymerization in the presence of a compound (component 3) containing at least two functional groups selected from the group consisting of (a) a carboxyl group or its functional derivatives, (b) a cyclic carboxylic anhydride group or its precursor, (c) a primary or secondary amino group, (d) an isocyanate group, or its stabilized groups or precursors, (e) an iminoacetic acid group or its functional derivatives, and (f) a hydroxyl group, thereby to form a modified solvent-soluble low-molecular-weight polyester (component A') in which at least 30 mole% of the entire terminal groups are aryl carboxylate groups, and (2) mixing the resulting component A or A' with a monomeric or solvent-soluble polymeric, polyfunctional compound (component B) containing at least two reactive groups selected from the class consisting of a hydroxyl group and a primary or secondary amino group, or (3) partially reacting the resulting component A or A' with the above polyfunctional compound (component B).

The depolymerization reactions for forming the low-molecular-weight polyester (component A) or the modified low-molecular-weight polyester (component A') and the mixing, or partial reaction, of these polyesters with the polyfunctional compounds (component B) can be performed either in the molten state without using a solvent, or in the presence of a solvent. In the latter case, the polymer composition as a final product can be obtained in the form of a solution in a solvent.

When polymers containing an ethylene glycol residue (for example, polyethylene terephthalate or polyethylene naphthalene dicarboxylate) are used as the linear polyester, and depolymerized with diaryl carbonates to form aryl ester groups at the ends, ethylene carbonate occurs as a by-product, as schematically shown below.

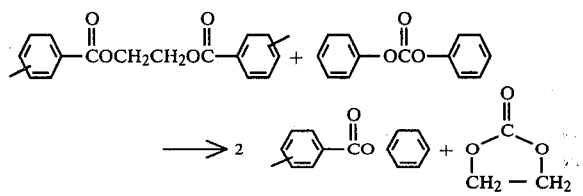

However, the by-products act as a good solvent, and therefore, all the components can be utilized effectively.

Thus, according to the present invention, there is provided a heat-curable solvent-soluble ester group-containing polymer composition comprising (I) a mixture of (1) a solvent-soluble low-molecular-weight polyester in which at least 30 mole% of the entire terminal groups are aryl carboxylate groups (component A) or a solvent-soluble low-molecular-weight polyester modified with a compound (component 3) containing at least two functional groups selected from the class consisting of (a) carboxyl group or its functional derivatives, (b) a cyclic carboxylic anhydride group or its precursor, (c) a primary or secondary amino group, (d) an isocyanate group or its stabilized groups or precursors, (e) an aminoacetic acid group or its functional derivatives, and (f) a hydroxyl group, in which at least 30 mole% of the entire terminal groups are aryl carboxylate groups (component A'), and (2) a monomeric or solvent-soluble polymeric, polyfunctional compound (component B) containing at least two reactive groups selected from the class consisting of a hydroxyl group and a primary or secondary amino group, or (II) a solvent-soluble partial reaction product between said polyester (component A) or polyester (component A') and said polyfunctional compound (component B).

The polymer composition of this invention contains aryl carboxylate groups as terminal groups. Since the aryl carboxylate groups have very high reactivity with the hydroxyl group and/or primary or secondary amino group of the component B a condensation reaction between the component A or A' and the component B proceeds easily by heating the polymer composition after it is shaped into the desired form directly or from its solvent solution. Thus, the curing reaction proceeds at lower temperatures and/or within shorter periods of time than in the case of resin compositions which cure, for example, by other ester-forming reactions such as a reaction between an alkyl carboxylate group and a hydroxyl group or between a free carboxyl group and a hydroxyl group. In addition, by this curing reaction, cured resin products with a greater extent of curing can be prepared. The curing can also be effected in the presence of a lesser amount of a curing agent. Accordingly, not only can the curable polymer composition of this invention be cured easily, but also the composition can be formed into cured resin products having superior heat resistance or mechanical properties as a result of a greater degree of curing reaction.

Furthermore, according to the present invention, the low-molecular-weight polyester (A) or its modified product (A') can be mixed or partially reacted with another reactive monomer or its oligomer (component C) containing an amide, imide, hydantoin or ester linkage, by utilizing the high activity of the aryl ester groups. This gives cured products with improved properties such as heat resistance or mechanical characteristics suitable for various ends uses.

It is also possible to obtain a reaction product (D') between component (A) or (A') and the component (C) by performing the reaction of forming the low-molecular-weight polyester (A) or its modified product (A') and the reaction of forming the component (C) in the same reactor either simultaneously or in an optional order. This has the advantage that the component (A) or (A') and the component (C) need not be prepared separately, but can be prepared continuously in the same reactor.

In order to achieve the above objects and advantages, the present invention provides a process for preparing a solvent-soluble heat-curable ester group-containing polymer composition, which comprises (i) using (1) a highly polymerized linear polymer (component 1), (2) a diaryl carbonate (component 2) and (3) a compound (component 3) containing at least two functional groups selected from the group consisting of (a) a carboxyl group or its functional derivatives, (b) a cyclic carboxylic anhydride group or its precursors, (c) a primary or secondary amino group, (d) an isocyanate group or its stabilized groups or precursors), (e) an iminoacetic acid group or its functional derivatives and (f) a hydroxyl group, and (ii) reacting component 1 with 5 to 95 mole%, based on the total moles of the dibasic acid contained in the component 1, of a diaryl carbonate (component 2) at a temperature of, for example, 100° to 300° C. to depolymerize it and to form a solvent-soluble low-molecular-weight aromatic polyester (component A) in which at least 30 mole% of the entire terminal groups are composed of aryl carboxylate groups; optionally performing said depolymerization reaction in the presence of the component 3 to form a modified solvent-soluble low-molecular-weight aromatic polyester (component A'), (iii) meanwhile reacting at least two species of component 3, if desired, in the presence of the component 2 thereby to form a monomeric or solvent-soluble low-molecular-weight polymeric condensation component (component C) in which the main chain consists of at least one linkage selected from amide, imide, hydantoin and ester linkages and at least 50 mole% of the entire terminal groups are carboxyl groups or functional derivatives thereof, (iv) mixing the component A or A' with component C to form a mixture (D), or (v) performing the reaction of forming the component A and the reaction of forming the component C in the same reactor either simultaneously or in an optional order to form an oligomeric reaction product (D') of the components 1, 2 and 3, and (vi) mixing or partially reacting the mixture (D) or the reaction product (D') with a monomeric or polymeric solvent-soluble polyfunctional compound (component B) containing at least two reactive groups selected from the group consisting of a hydroxyl group and a primary or secondary amino group.

According to the above process, there is provided a solvent-soluble heat-curable ester group-containing polymer composition comprising a mixture or partial reaction product formed between (I) either (1) a mixture (mixture D) consisting of (i) a solvent-soluble low-molecular-weight polyester in which at least 30 mole% of the entire terminal groups are aryl carboxylate groups (component A) or a modified solvent-soluble low-molecular-weight polyester (component A') in which at least 30 mole% of the entire terminal groups are composed of aryl carboxylate groups and which is modified with a compound (component 3) containing at least two functional groups selected from the group consisting of (a) a carboxyl group or its functional derivatives, (b) a cyclic carboxylic acid anhydride group or its precursors, (c) a primary or secondary amino group, (d) an isocyanate group or its stabilized groups or precursors, (e) an iminoacetic acid or its functional derivatives, and (f) a hydroxyl group and (ii) a monomeric or solvent-soluble low-molecular-weight polymeric condensation component (component C) in which the main chain consists of at least one linkage selected from amide, imide, hydantoin and ester linkages and at least 50 mole% of the entire terminal groups are carboxyl groups or functional derivatives thereof, said component C being obtained by reacting at least two of said component 3, if desired in the presence of the component 2, or (2) an oligomeric reaction product of components 1, 2 and 3 formed by performing the reaction of forming the component A and the reaction of forming the component C in the same reactor either simultaneously or in an optional order, and (II) a monomeric or polymeric solvent-soluble polyfunctional compound (component B) containing at least two reactive groups selected from the group consisting of a hydroxyl group and a primary or secondary amino group.

Since in addition to the component A or A' and the component B, the reactive component C having an amide, imide, hydantoin or ester linkage is mixed or partially reacted in the polymer composition of this invention, the present invention can thus provide curable polymer compositions having superior flexibility, curability, mechanical properties and workability as a result of the introduction of the aromatic polyester component when compared with, for example, conventional cured products of polyamides, polyimides, polyamideimides or polyhydantoin.

The present invention can afford novel ester group-containing polymer compositions having the various useful properties as mentioned hereinabove by a combination of the following features.

(i) The diaryl carbonate has the superior ability to react with a linear highly polymerized aromatic carboxylate with high activity and to depolymerize it while forming aryl carboxylate groups at the terminal groups.

(ii) The diaryl carbonate has the ability to form aryl carboxylate groups by reaction with carboxyl groups with high activity.

(iii) As compared with carboxyl groups or alkyl carboxylate groups, the aryl carboxylate groups formed as a result of (i) and (ii) above have very superior reactivity with amino groups having relatively poor reactivity, such as aromatic amino groups, or with hydroxyl groups of the curing agent which has relatively low reactivity.

(iv) In some cases, the diaryl carbonate has the ability to react with, for example, a primary amino group to form an aryl urethane group (a kind of a stabilized isocyanate group) and to promote the formation of an amide linkage by reaction with a carboxyl group, and also to form a hydantoin ring linkage by reaction with an iminoacetic acid group.

The invention will be described in detail below.

[I] RAW MATERIAL

I-1. Highly Polymerized Linear Aromatic Polyester (component 1):

The highly linear aromatic polyesters used in the present invention are substantially linear polymers of which main recurring units are composed of an aromatic dicarboxylic acid residue and an aliphatic glycol residue and which have degrees of polymerization suitable for fabrication into fibers, films and other articles. These polymers also include fusible highly polymerized polyesters having branches and partly having a at least three functional polyol residue and/or polycarboxylic acid residue.

Examples of the aromatic dicarboxylic acid residue which constitutes such highly polymerized linear aromatic polyesters are residues of terephthalic acid, isophthalic acid, 2,6-, 2,7- or 1,5-naphthalenedicarboxylic acid, diphenoxyethanedicarboxylic acid, diphenyldicarboxylic acid, diphenylsulfonedicarboxylic acid, diphenyletherdicarboxylic acid, or benzophenonedicarboxylic acid. On the other hand, the glycol component constituting the aromatic polyester is preferably an aliphatic glycol in which the two hydroxyl groups are spaced from each other by 2 to 6 carbon atoms. Examples of such glycols are ethylene glycol, propylene glycol, trimethylene glycol, tetramethylene glycol, 1,3-butanediol, pentamethylene glycol, hexamethylene glycol, or 1,4-butane-2-diol. Each of these dicarboxylic acids and glycols may be used alone or in combination of two or more.

Especially preferred highly polymerized aromatic polyesters are those obtained by the reaction of a dicarboxylic acid or its functional derivative at least 80 mole% of which consists of terephthalic acid with a glycol containing 2 to 6 carbon atoms or its functional derivative.

Specific examples of the aromatic polyesters derived from the aromatic dicarboxylic acids and the aliphatic glycols include polyethylene terephthalate, polyethylene isophthalate, polyethylene (terephthalate-isophthalate)copolymer, polypropylene terephthalate, polytetramethylene terephthalate, polyhexamethylene terephthalate, polyethylene-2,6-naphthalene dicarboxylate, polytetramethylene-2,6-naphthalene dicarboxylate, and polyethylene diphenoxyethane dicarboxylate. It is advantageous to use scraps or wastes of polyethylene terephthalate, polyethylene(terephthalate-isophthalate), polytetramethylene terephthalate and polyethylene-2,6-naphthalenedicarboxylate which are being manufactured in great quantities on an industrial scale. The polyethylene terephthalate is most suitable for use in preparing the liquid compositions of this invention.

Suitable substantially linear polyesters such as polyethylene terephthalate are those having an intrinsic viscosity [$\eta$], measured on an o-chlorophenol solvent at 35° C., of above 0.30, preferably above 0.40.

For some purposes, those polyesters which have an intrinsic viscosity of about 0.1 as a result of undergoing hydrolysis, for example, in the course of becoming scraps or wastes can also be used without involving appreciable troubles.

I-2. Diaryl Carbonate (component 2):

Preferably, the aryl group of this component has 5 to 15 carbon atoms. Such aryl groups may be derived from, for example, a benzene, naphthalene or pyridine ring and contain an inert substituent such as a halogen atom, a nitro group, an alkoxy group, an alkyl group containing 1 to 3 carbon atoms or a cyano group. The electron-attracting substituents have an effect of increasing the reactivity of the diaryl carbonate and also the reactivity of the aryl ester group formed at the terminal groups by the reaction of the aryl carbonate with the polyester.

When the curable composition of this invention is cured, phenols resulting from the attachment of a hydroxyl group to the aryl group are released. Accordingly, the ease of removing these phenols should also be taken into consideration.

Preferred diaryl carbonates are those of the following formula

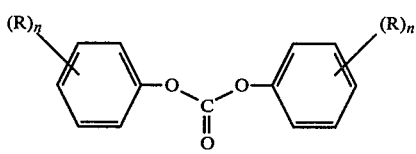

wherein R is a methyl group, a halogen atom or a nitro group and n is 0, 1 or 2.

Especially suitable diaryl carbonates are, for example, diphenyl carbonate, dicresyl carbonate, bis-(2-chlorophenyl) carbonate, bis-(4-nitrophenyl) carbonate, and bis(diphenyl carbonate). The use of diphenyl carbonate which is being produced in great quantities on an industrial scale as material for producing polycarbonates is preferred.

I-3. Compound containing at least two functional groups (a) to (f) (component 3):

Examples of compounds containing at least two functional groups selected from the class consisting of (a) a carboxyl group or its functional derivatives, (b) a cyclic carboxylic anhydride group or its precursors, (c) a primary or secondary amino group, (d) an isocyanate group or its stabilized groups or precursors, (e) an iminoacetic acid group or its functional derivatives, and (f) a hydroxyl group are given below.

(i) Compounds containing a carboxyl group or its functional derivatives:

Aromatic polycarboxylic acids such as terephthalic acid, isophthalic acid, naphthalenedicarboxylic acids, diphenylsulfonedicarboxylic acids, benzophenonedicarboxylic acids, or trimesic acid; alicyclic polycarboxylic acids such as cyclohexanedicarboxylic acid; and aliphatic polycarboxylic acids such as adipic acid or sebacic acid. Polycarboxylic acids containing 1 to 3 such groups as imide, hydantoin, oxadiazole, benzimidazole, benzoxazole or triazole groups in the molecule can also be used.

As the polycarboxylic acids containing imido groups in the molecule, the following compounds can be used advantageously.

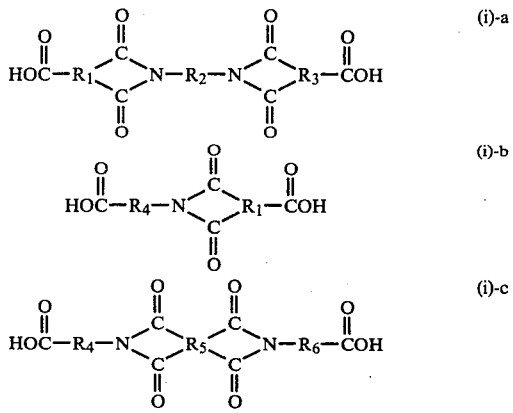

wherein $R_2$, $R_4$ and $R_6$ are divalent organic groups, $R_1$ and $R_3$ are trivalent organic group, and $R_5$ is a tetravalent organic group.

Examples of the functional derivatives of a carboxyl group are residues of aryl esters, lower alkyl esters, acid halides, half esters and partial acid halides of the polycarboxylic acids exemplified above. The aryl ester groups are especially preferred because they have high reactivity and can be utilized for forming terminal aryl ester groups of component C or A'. Examples of preferred aryl groups are phenyl, cresyl, xylenyl, nitrophenyl, halogenophenyl, pyridyl, and naphthyl.

(ii) Compounds containing a cyclic carboxylic anhydride group or its precursors:

Examples of these compounds are tricarboxylic acid anhydrides such as trimellitic anhydride, naphthalenetricarboxylic anhydride, or benzophenonetricarboxylic anhydride, and tetracarboxylic dianhydrides such as pyromellitic dianhydride, benzophenonetetracarboxylic dianhydride, diphenylsulfonetetracarboxylic dianhydride, azobenzenetetracarboxylic dianhydride, butanetetracarboxylic dianhydride or cyclopentanetetracarboxylic dianhydride. Compounds obtained by ring-opening the anhydride groups of these anhydrides with water, alcohols or phenols, etc. can also be used.

The tricarboxylic anhydrides whose carboxyl groups other than the anhydride groups are converted to their functional derivatives such as alkyl carboxylates, aryl carboxylate, or acid halides can also be used. The aryl ester groups are especially preferred because they have high reactivity, and can be utilized also in forming the aryl ester terminals of the component C or A'. Examples of the preferred aryl groups are phenyl, cresyl, xylenyl, nitrophenyl, halogenophenyl, pyridyl, and naphthyl. Of these compounds, phenyl and cresyl esters of trimellitic anhydrides are especially preferred.

(iii) Compounds containing a primary or secondary amino group:

The compounds belonging to this group are roughly classified into polyamines, aminocarboxylic acids and aminohydroxy compounds.

Examples of the polyamines (aromatic, alicyclic and aliphatic) are m- or p-phenylene diamine, 4,4'-diaminodiphenylmethane, 4,4'-diamino-3,3'-dimethyldiphenylmethane, 4,4'-diamino-3,3'-dichlorodiphenylmethane, 4,4'-diaminodiphenyl ether, 4,4'-or 3,3'-diaminodiphenylsulfone, 1,5-diaminonaphthalene, 3,4'-diaminodiphenyl ether, tetramethylene diamine, hexamethylene diamine nonamethylene diamine, 4,4'- diaminodicyclohexylmethane, cyclohexanebis (methylamine), xylylene diamine, 2,4- or 2,6-toluylene diamine, polyphenylene-polymethylene-polyamine (a condensate of aniline and formaldehyde), tris(aminophenyl)methane, 2,4,4'-triaminodiphenyl ether, piperazines, benzidine, and 3,3', 4,4'-tetraaminodiphenylmethane.

Specific examples of the aminocarboxylic acids are m- or p-aminobenzoic acid, 4(4-aminophenoxy)benzoic acid, $\epsilon$-aminocaproic acid, $\beta$-aminopropionic acid, and esters of these amino acids.

Specific examples of the aminohydroxy compounds are amino alcohols such as ethanolamine, propanolamine or aminopropane-1,2-diol, and aminophenols such as 3,3'-dihydroxybenzidine or 2,4-diaminophenol.

(iv) Compounds containing an isocyanate group or its stabilized groups or precursors:

Examples of these compounds are polyisocyanates such as tetramethylene-1,4-diisocyanate, hexamethylene-1,6-diisocyanate, cyclohexane-1,4-diisocyanate, dicyclohexylmethane-4,4'-diisocyanate, phenylene-1,3-diisocyanate, phenylene-1,4-diisocyanate, toluylene-2,6-diisocyanate, xylylenediisocyanate, toluylene-2,4-diisocyanate, diphenylmethane-4,4'-diisocyanate, naphthylene-1,5-diisocyanate, hexahydrodiphenyl-4,4'-diisocyanate, azobenzene-4,4'-diisocyanate, diphenylsulfone-4,4'-diisocyanate, diphenylsulfone-4,4'-diisocyanate, diphenylsulfone-3,3'-diisocyanate, anthraquinone-diisocyanate or polyphenylene-polymethylene-polyisocyanate; and isocyanate carboxylic acid esters such as ethyl m- or p-isocyanatebenzoate or 4-(4-isocyanatephenoxy) benzoate. There can also be used isocyanate derivatives obtained by reacting a part or whole of the isocyanate groups of these compounds with ROH in which R is a hydrocarbon group.

(v) Compounds containing an iminoacetic acid group or its functional derivatives:

Examples of these compounds are polyimino acetic acids such as N,N'-bis-ethoxycarboxylmethyl-4,4'-diaminodiphenylmethane, N,N'-bis-ethoxycarbonylmethyl-4,4'-diaminodiphenylether, N,N'-bis-ethoxycarbonylmethyl-3,4'-diaminodiphenylether or N,N'-bisethoxycarbonylmethyl-m or p-diamino benzene, and carboxylic acidimino acetic acid compounds such as N-ethoxycarbonylmethyl-m or p-amino benzoic acid.

(vi) Compounds containing a hydroxyl group:

Polyols and hydroxycarboxylic acids are used in this invention as the hydroxyl-containing compounds.

Examples of preferred polyhydroxy compounds are diols such as ethylene glycol, propylene glycol, tetramethylene glycol, 1,4-cyclohexanedimethanol or bis-$\beta$-hydroxyethyl terephthalate, and difunctional or higher alcoholic polyols such as glycerine, trimethylol propane, tris-($\beta$-hydroxyethyl)isocyanurate, or pentaerythritol. Special examples of these compounds include partly polymerized epoxy resins and phenoxy resins, partially hydrolyzed polyvinyl acetate, and polyvinyl formal or polyvinyl butyral containing a residual hydroxy group. In some cases, difunctional or higher phenolic polyhydroxy compounds such as bisphenol A, bisphenol S, catechol, hydroquinone or resol-type phenolic resin can also be used.

Examples of the hydroxycarboxylic acids are $\epsilon$-hydroxycaproic acid, $\beta$-hydroxyethyl-4-carboxyphenyl ether, N(2,3-dihydroxypropyl) trimellitimide, N(4-or 3-hydroxyphenyl)trimellitimide, and m- or p-hydroxybenzoic acid.

I-4. Solvent:

In the depolymerization of the highly polymerized polyesters by reacting with diaryl carbonates in accordance with the present invention, the diaryl carbonate themselves act as a solvent in the early stage of the reaction, and ethylene carbonate formed as a by-product in the depolymerization reaction. Accordingly, in some cases, the present invention can be performed in the molten state or the molten-dissolved state without using any solvent. However, some types of component B or component C or their partial reaction products with the component A or A' have a considerably high melting point, and in such cases the present invention is carried out preferably in the presence of solvent. Preferred solvents are those which are inert and do not cause side-reactions and are stable during the reaction and which have a boiling point of 100° to 300° C. Furthermore, these solvents can dissolve the reaction product, and permit easy removal of such reaction products. Or they are easily removal at the time of curing.

Examples of suitable solvents are as follows:

(1) Disubstituted amides such as N-methyl pyrrolidone, N,N-dimethyl acetamide, dimethylformamide, tetramethylurea, and hexamethyl phosphoramide.

(2) Sulfones and sulfoxides such as dimethyl sulfoxide, dimethyl sulfone and tetramethylene sulfone.

(3) Ethers and esters such as ethylene glycol monomethyl ether acetate, butyl acetate, anisole, and o-nitroanisole.

(4) Ketones such as acetophenone.

(5) Halogenated hydrocarbons such as monochlorobenzene and dichlorobenzene.

(6) Aromatic hydrocarbons and nitrated products thereof such as nitrobenzene, nitrotoluene, cymene, biphenyl, diphenyl ether, toluene, and xylene.

(7) Phenols such as phenol, cresol and xylenol.

(8) Cyclic carbonates such as ethylene carbonate.

These solvents are used either alone or as admixtures. Of these solvents, the disubstituted amides, sulfones and sulfoxides and phenols are especially suitable since they can dissolve the reaction product well and be removed easily.

The amount of the solvent can be varied over a wide range according to various factors such as the type of the starting material, the type of the solvent or the structure of the product. Generally, however, the solvent is preferably used so that the solids content becomes 15 to 95% by weight.

The above solvents are used not only as mere reaction solvents but also as solvent components for rendering the curable compositions of this invention liquid, as will be described hereinbelow. In this case, the reaction solvents are frequently used directly as solvents for the resulting polymer compositions. Furthermore, as will be described hereinbelow, the by-products obtained can also be used as solvents.

I-5. Catalyst:

Frequently, the reaction in accordance with this invention is promoted by the addition of catalysts. The addition of catalysts is effective in any stage of the reaction, but the effect is especially conspicuous where diaryl carbonates participate in the reaction. Generally, almost all of ester-interchange catalysts can be used in this invention. Examples of such catalysts are sodium, potassium, lithium, calcium, magnesium, barium, tin, strontium, zinc, iron, aluminum, cobalt, lead, nickel, titanium, manganese, cadmium, antimony, and boric acid; oxides, hydroxides, hydrides, inorganic or organic acid salts, alcoholates, phenolates, and halides of these elements; or complex salts, double salts or organometallic compounds of these elements. Sodium hydride, potassium butoxide, calcium acetate, dibutyltin oxide, lead acetate, antimony acetate, manganese acetate, butyl titanate, and phenyl titanate are especially preferred catalysts.

Other examples of usable catalysts are tertiary amines such as triethylene diamine or N,N'-dimethylaniline and quaternary ammonium salts, either alone or in admixture with the ester-interchange catalysts exemplified above.

The amount of the catalyst varies according to the type of the starting material, the method of the reaction, or the reaction conditions, but generally is 0.005 to 15% by weight based on the reaction mixture (excluding the solvent).

(II) PROCESS FOR PREPARATION OF THE ESTER GROUP-CONTAINING POLYMER COMPOSITION

II-1. Solvent-soluble low-molecular-weight polyester (component A):

The solvent-soluble low-molecular-weight polyester which is a characteristic component of the ester group-containing polymer composition of this invention is generally prepared by reacting the highly polymerized linear aromatic polyester (component 1) with 5 to 95 mole%, based on the total amount in moles of the dibasic acid contained in the component 1, of a diaryl carbonate component (component 2) at a temperature of, for example, 100° to 300° C. to depolymerize the polyester (component 1).

The reaction of the polyester (component 1) with the diaryl carbonate component (component 2) is schematically shown below when the former is polyethylene terephthalate, and the latter is diphenyl carbonate.

(a) Depolymerization and the reaction of forming an aryl ester group:

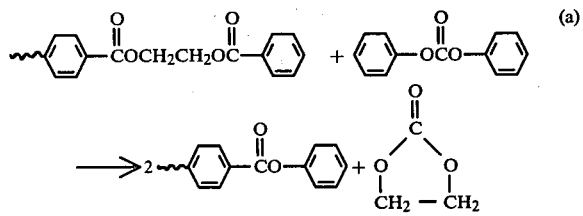

(∼∼ represents a polyethylene terephthalate chain; the same representation applies to the same symbols appearing hereinafter.)

This shows that 1 mole of the diphenyl carbonate reacts with 1 mole of the ethylene terephthalate recurring unit to decompose the bond of the latter and form 2 moles of a phenylester bond. Thus, simultaneously with the depolymerization, the introduction of an aryl ester group into the ends of the depolymerized polyester is effected.

Furthermore, at the ends of the original highly polymerized polyester, conversion to aryl ester groups occurs by the effect of the diaryl carbonate, although the content of such aryl ester groups is low, as shown below.

(b) Reaction with terminal carboxyl groups

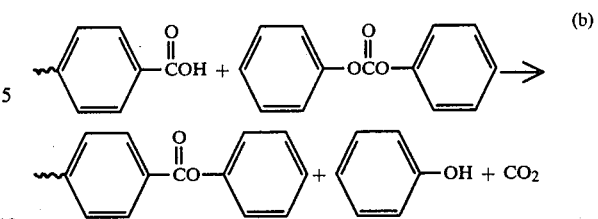

(c) Reaction with terminal alkyl ester groups (for example, methyl ester groups)

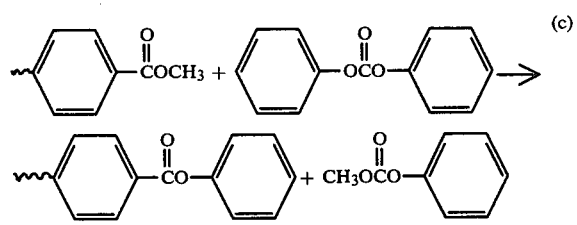

(d) β-hydroxyethyl ester group ends

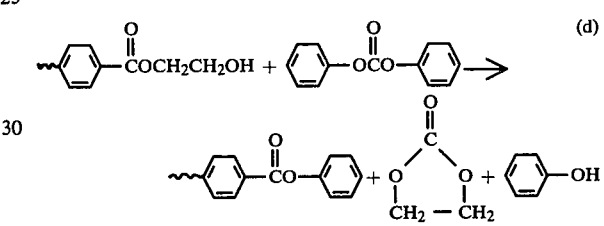

In any case, depending upon the conditions, almost all the end groups of the depolymerized polyester can be converted to aryl ester groups. Generally, when the proportion of the diaryl carbonate (component 2) based on the highly polymerized polyester (component 1) is large, the reaction (a) above occurs in a greater degree. Accordingly, the extent of the depolymerization occurs, and the depolymerized polyester with a low degree of polymerization is obtained, and the content of the terminal aryl ester groups increases. When the proportion is smaller, the result is contrary.

As mentioned above, the diaryl carbonate is used in an amount of 5 to 95 mole% based on the total amount in moles of the dibasic acid contained in the component 1. The preferred amount is 10 to 70 mole%, especially 15 to 55 mole%.

It will be readily understood by those skilled in the art from the above description that the average degree of polymerization of the resulting depolymerized polyester and its end groups can be easily controlled according to the type and degree of polymerization of the polyester (component 1) and the amount of the diaryl carbonate.

The depolymerized polyester having a low degree of polymerization contains at least three dibasic acid residues on an average per molecule, and has an inherent viscosity ($\eta_{inh}$), measured on an m-cresol or o-chlorophenol solution in a concentration of 0.5 g/100 ml. at 30° C., of 0.02 to 0.4, preferably 0.05 to 0.2. Depending upon the conditions, almost all of the end groups of the polyester can be converted to aryl ester groups. In the present invention, the content of the terminal aryl ester groups of the low-molecular-weight polyester is limited to at least 30 mole% of the entire terminal groups because this content is desirable for the terminal aryl ester groups in the curable polymer composition to take advantage of their good reactivity. More preferably, the content of the terminal aryl ester groups is at least 50 mole%, especially at least 70 mole%.

The content of the terminal aryl ester groups of the polyester (A) or (A') having a low degree of polymerization can be determined by completely hydrolyzing the polyester, and measuring the phenol content of the hydrolyzed product. But since this procedure is time-consuming and troublesome, there is used a procedure in which a calibration curve is prepared from the contents of the aryl ester groups and relative intensities of the characteristic absorptions attributable to the aryl ester groups in the infrared absorption spectrum of the polymer (for example, in the case of a phenyl ester, absorptions appear at 750 cm$^{-1}$, 1080 cm$^{-1}$, and 1190 cm$^{-1}$). This permits the determination of the content of the aryl ester groups from the infrared absorption spectrum of the polymer. When the number average molecular weight of the polymer is measured by a known method such a gel permeation chromatography or the determination of the inherent viscosity, the number of the entire terminal groups can be calculated. This permits the calculation of the content of the terminal aryl ester groups based on the entire terminal groups.

Alternatively, the content of each type of theoretically possible end groups other than the terminal aryl ester groups is measured, and the measured contents are totalled. The total is defined as the total amount of the end groups, and the abovementioned aryl ester group content is divided by this total amount of the end groups. The result is defined as the content of terminal aryl ester groups.

Specific methods for calculating the content of the terminal aryl ester groups of ordinary polyesters (component A) whose end groups are considered as consisting only of carboxyl, hydroxyl and aryl ester groups are shown below.

(1) Determination of the terminal hydroxyl groups:

The reaction product is dissolved in for example α-methyl naphthalene, and reacted with succinic anhydride for 3 hours at 155° C. The terminal hydroxyl groups of the reaction product are converted to carboxyl groups. The carboxyl groups are titrated with sodium hydroxide. An increase in the amount of the terminal carboxyl groups from the untreated reaction product is calculated as the amount of terminal hydroxyl groups.

(2) Determination of terminal carboxyl groups:

The reaction product is dissolved in for example benzyl alcohol or N-methyl pyrrolidone, and subjected to an electric potential titration using a 0.1 N isopropyl alcohol solution of potassium hydroxide to determined the amount of the terminal carboxyl groups.

(3) Determination of terminal aryl ester groups:

The reaction product is added to a 2 N aqueous solution of sodium hydroxide, and hydrolyzed for 48 hours at 80 to 90° C. The feed phenol is determined, for example, by a bromine method.

The content of the terminal aryl ester groups can thus be calculated on the basis of the following equation.

$$\text{Content of terminal aryl ester groups (mole \%)} = \frac{\text{Amount of the terminal aryl ester groups}}{\text{Total amount of the terminal hydroxy groups, terminal carboxyl groups and terminal aryl ester groups}} \times 100$$

As is clear from the above reaction equations, the low polymer which has been depolymerized to a considerable extent has a larger content of carboxyl with the loss of a glycol component, and therefore, the ends consist almost solely of carboxyl derivatives. Thus, the terminal hydroxyl groups can be neglected. For simplicity, therefore, the content of the terminal aryl ester groups can be calculated also from the following equation.

$$\text{Content of terminal aryl ester content (mole\%)} = \frac{\left(\begin{array}{c}\text{Content of all} \\ \text{end groups} \\ \text{(mole/g)}\end{array}\right) - \left(\begin{array}{c}\text{Content of} \\ \text{carboxyl groups} \\ \text{(mole/g)}\end{array}\right)}{\text{Content of all end groups (mol/g)}}$$

The content of carboxyl groups (mole g) is determined by the above-mentioned neutralization titration. The total end group content (mole/g) can be calculated from the number average molecular weight calculated, for example, on the basis of the $$\text{inherent viscosity } \left(\frac{2}{\text{number average molecular weight}}\right).$$

More specific examples of calculation will be given in the Examples hereinbelow.

The reaction between the component 1 and the component 2 is generally promoted by the presence of an ester-interchange catalyst. Since, however, it is usual that the highly polymerized polyester (component 1) contains the residue of an ester-interchange catalyst added at the time of polymerization, it is frequently unnecessary to add any fresh catalyst. However, if it is desired to promote the reaction further, a fresh catalyst may be added. Examples of such catalysts and their amounts have already been described in the section above dealing with RAW MATERIAL.

Generally, the temperature at which the component 1 is reacted with the component 2 is 100° to 300° C., and can be selected according to the type and proportion of the raw material, the presence or absence of the catalyst, the type or amount of the catalyst. Especially preferred temperatures are 150° to 250° C. Of course, in the early stage or towards the end of the reaction, the temperature may be below 100° C., or temporarily rise above 300° C.

The reaction can be performed at atmospheric pressure preferably in an inert atmosphere such as an atmosphere of nitrogen or argon, but it can also be carried out at a reduced or elevated pressure. When the reaction is carried out at reduced pressure, it is necessary that the diaryl carbonate be not evaporated.

Generally, in the early stage of the reaction, the molten diaryl carbonate acts as a reaction solvent and with the progress of the reaction, a by-product such as ethylene carbonate or phenols acts as a solvent. The depolymerization reaction can therefore be performed in the absence of a solvent. If desired, a solvent may be present in the reaction system. Especially suitable solvents for use in such a case are phenols such as phenol or cresol or cyclic carbonates such as ethylene carbonate which are the same as the above by-products. Solvents having a boiling point of at least 100° C. such as tetramethylene sulfone, N-methylpyrrolidone, anisole, acetophenone, xylene, or cumene can also be used.

The reaction time is generally 0.5 to 10 hours, although it differs according to the other reaction conditions.

The resulting low-molecular-weight polyester can be used as such for preparing the polymer composition of this invention. It can also be used after having been purified by a conventional procedure such as reprecipitation.

The use of the polyester containing terminal aryl ester groups obtained by the above method is most effective economically. Such low-molecular-weight polyesters can also be obtained by the following methods.

(i) Method comprising reacting a diaryl ester of a dibasic acid such as diphenyl terephthalate with a diol such as ethylene glycol with the former used in excessive molar amounts.

(ii) Method comprising reacting a dibasic acid or its lower alkyl ester with a diol with the former being used in an excessive molar amount to form a polyester with a low degree of polymerization whose ends consist mainly of carboxyl groups or lower alkyl ester groups, and reacting the polyester with an aryl ester-forming agent such as a diaryl carbonate.

(iii) Method comprising reacting a dibasic acid with a diol with the latter being used in excess to form a polyester with a low degree of polymerization whose ends consist mainly of hydroxyl groups, and reacting the polyester with a diaryl ester of a dibasic acid and/or diaryl carbonate to convert the terminal groups to aryl ester groups.

(iv) Method involving the depolymerization of a highly polymerized polyester (same as component 1) using a diaryl ester of a dibasic acid.

II-2. Modified solvent-soluble polyester with a low degree of polymerization (component A'):

For some uses of the polymer compositions of this invention, the use of modified solvent-soluble terminal aryl ester group-containing polyesters with a low degree of polymerization (component A') obtained by performing the depolymerization reaction of the component 1 and the component 2 in the presence of the component 3 is preferred. The "presence" here means not only that the components 1, 2 and 3 are simultaneously added and reacted, but also that for example, the component 1 is first reacted with the component 3 and then the component 2 is added for further reaction.

The sequence of addition and the method of reaction differ according to the type of the component 3, and can be selected according to the desired modification of the polymer. For example, when a polyol compound is used as the component 3, it is preferred to react the component 1 first with the component 3, and then react the resulting mixture with the component 2 in order to prevent side reactions. By using a polyol compound different from the glycol component in the polyester (component 1), there can be obtained a modified low-molecular-weight polyester containing a glycol residue different from the above starting polyester which is suitable for certain usages of the polymer composition.

When at least one of a polycarboxylic acid, its functional derivative, or a hydroxycarboxylic acid is used, it is possible to react the component 1 with the component 3 and then react the reaction product with the component 2. The components 1, 2 and 3 can also be reacted simultaneously. Thus, in this case, a modified low-molecular-weight polyester having different components of the carboxylic acid residue from those in the starting polyester can be obtained by using a different component from the carboxylic acid component of the starting polyester (component 1). For example, by using an imide-containing dicarboxylic acid, an imido-modified low-molecular-weight polyester can be obtained. This enables a cured product thereof to have improved heat resistance.

Likewise, when an amino-containing component 3 is used, an amido-modified component A' can generally be obtained, and in a special case, there can be obtained component A' modified with a urethane group or a urea group as a result of the participation of the diaryl carbonate in the reaction.

When a component 3 containing an isocyanate group or a stabilized isocyanate group is used, a component A' modified with a urethane group can generally be obtained. In a special case, there can be obtained an amido-modified component A' as a result of the reaction of it with a carboxyl group, for example.

Of the exemplified compounds as component 3, the aromatic tri- or tetra-carboxylic acids or their anhydrides, polycarboxylic acids containing a heterocyclic group such as an imide ring or benzoxazole ring, or their functional derivatives, glycols, and aliphatic polyamines are especially preferred.

The suitable amount of the modifier to be added varies greatly according to the type of the component 3 used. But generally, it is 5 to 150 mole%, more preferably 10 to 100 mole%, especially preferably 15 to 70 mole%, based on the amount of the dibasic acid residue in the highly polymerized polyester (component 1) to be modified.

The reaction conditions for the above modifying reaction such as the reaction temperature, reaction time and reaction solvent may be substantially the same as those mentioned with regard to the reaction between the component 1 and the component 2 described in paragraph II-1 above.

Since the amount of the diaryl carbonate relates not only to the depolymerization reaction but also to various other reactions, its stoichiometrically required amount needs to be adjusted when it is to be consumed in the modifying reaction. Calculation of this amount can be made easily by those skilled in the art with or without the need of a simple experiment in each case.

The content of terminal aryl ester groups of the modified product (component A') cam also be calculated basically in accordance with the methods described in paragraph II-1.

When other groups are present as a result of modification, known and group analysis methods may be combined. For example, when terminal amino groups are possibly present, neutralization titration with strong acids is effected. In the case or urethane groups, a dialkylamine is reacted, and its amount of consumption is determined by back titration. Specific methods of the analysis are described in the Examples.

II-3. Monomeric or solvent-soluble polymeric polyfunctional compounds (component B) containing at least two reactive groups selected from a hydroxyl group and/or primary or secondary amino group:

This component B reacts with the component A or A' and in some cases, also with the terminal reactive groups composed mainly of aryl ester groups, and thus, cures the polymer composition of this invention while forming an ester group and/or an amide group.

Accordingly, the component (B) may be any monomeric or polymeric compounds which contain at least two amino groups and/or hydroxyl groups having reactivity with aryl ester groups and are miscible with the component A, etc., and they can be chosen according to the desired properties of the final composition. In view of the reactivity with aryl ester groups at the time of curing, the hydroxyl groups are preferably alcoholic hydroxyl groups, and the amino groups are preferably primary or secondary amino groups bonded to an aliphatic group.

Since an aromatic amide groups derived from aromatic carboxylic acid residues and aromatic amine residues are stable both chemically and thermally, compounds containing aromatic amino groups can also be used suitably when the polymer composition of this invention can be cured at sufficiently high temperatures.

Furthermore, in view of the efficiency of a curing reaction, at least a part (for example, at least 30 mole%, preferably at least 50 mole%) of the component B is advantageously replaced by a trifunctional or higher compound.

The compound B can also contain a functional group which reacts at the time of curing, for example, the functional groups (a) to (f) of the component 3 described above, specifically a carboxyl group or its functional derivatives (including acid anhydride groups), or a stabilized isocyanate group, in addition to the amino groups and/or hydroxyl groups.

Examples of monomeric compounds as component B are those compounds which fall within the component 3 described in [I] above and which contain at least two reactive groups selected from hydroxyl, primary amino, and secondary amino groups. Examples of especially preferred components for use in the present invention are glycerol, trimethylolethane, trimethylolpropane, 1,2,6-hexanetriol, tris-($\beta$-hydroxyethyl)isocyanurate, pentaerythritol, 2-amino-propane-1,3-diol, 1-amino-propane-2,3-diol, 2-amino-2-methyl-propane-1,3-diol, tris-(hydroxymethyl)-aminomethane, 1-amino-2,2-bis-(hydroxymethyl)-propane-3-ol, polyphenyl-polymethylene-polyamines (condensates formed between aniline and formaldehyde), 4,4'-diaminodiphenylmethane, ethylene glycol, tetramethylene glycol, 1,4-cyclohexane dimethanol, m-xylylene diamine, and phenyl 3,5-diaminobenzoate.

Examples of polymeric compounds as component B are polymers containing pendant hydroxyl groups such as polyvinyl formal, polyvinyl butyral, partially hydrolyzed polyvinyl acetate, polyvinyl alcohol, poly-$\beta$-hydroxyethyl methacrylate copolymer, cellulose diacetate, and phenoxy resins, epoxy resins; and amino-containing polymers such as polyethyleneimine.

Other examples of the polymeric component B include solvent-soluble oligomers obtained by reacting at least two compounds of the component 3 described in [I] above with or without the component 2, and in which the main chain consists of at least one of amide, imide, hydantoin, and ester bonds and the ends are composed of at least two primary or secondary amino groups and hydroxyl groups on an average per molecule.

The above low-molecular-weight polymers can be easily prepared by any conventional polymer preparation methods well known to those skilled in the art.

Typical examples of basic main chain-forming reactions are listed below.

(a) Imide bond

Reaction of a cyclic acid anhydride group or its ring-opened product prepared by using water and/or an alcohol, with a primary amine or an isocyanate group (including a stabilized isocyanate group).

(b) Amide bond

Reaction of a carboxyl group or its functional derivative such as a carboxylic acid halide, aryl carboxylate or lower alkyl carboxylate group with an amino group, or reaction of a carboxyl group with an isocyanate group.

When it is desired to form an amide bond by reacting a carboxyl group with an aromatic amino group having low nucleophilicity, the amide-forming reaction can be promoted by the presence of a diaryl carbonate (component 2) or triphenyl phosphite.

(c) Hydantoin bond

Reaction of an N-aryl-substituted glycine derivative (an iminoacetic acid group or its ester) with an isocyanate group; or reaction of an N-carbonic acid substituted-N-aryl substituted glycine derivative with an amino group; or reaction of iminoacetic acid or its ester with an amino group and a diaryl carbonate (component 2).

(d) Ester bond

Reaction of a carboxyl group or its functional derivative such as a carboxylic acid halide, aryl carboxylate or lower alkyl carboxylate group, with a hydroxyl group.

When it is desired to obtain polymers containing at least two of these bonds (a) to (d) in the main chain, these reactions are optionally combined.

By determining which of these basic reactions are to be employed in what order, the types of monomers embraced within the component 3 to be used will be automatically determined.

As is clear from the above basic reactions, the formation of the main chain involves an amino group, an isocyanate group as its derivative, and a hydroxyl group. Accordingly, by using the reagents so that an amino group and/or hydroxyl group are present in an amount exceeding that which would be consumed by the main chain-forming reaction, oligomers containing at least two amino groups and/or hydroxyl groups on an average can be easily prepared.

It is not necessary that all of the end groups or reactive pendant groups be amino groups and/or hydroxyl groups, but as stated previously, they may contain other functional groups described above, preferably those which will form a stable bond as a result of the reaction.

Examples of suitable low-molecular-weight polymers so obtainable are as follows:

(a) Hydroxyl-terminated oligomeric polyesters obtained by reacting polycarboxylic acids (for example, terephthalic acid, isophthalic acid, trimesic acid or 2,6-naphthalenedicarboxylic acid) with an excess of polyols (for example, ethylene glycol, propylene glycol, glycerol, trimethylolpropane, or tris (3-hydroxyethyl cyanurate));

(b) Oligomeric polyimides or polyamideimides containing terminal amino groups obtained by reacting tricarboxylic acid anhydrides and/or tetracarboxylic acid anhydrides (for example, trimellitic anhydride, butanetetracarboxylic dianhydride, or benzophenonetetracarboxylic dianhydride) or ring-opened products thereof with an excess of polyamines (for example, 4,4-diaminodiphenylmethane, diethylenetriamine, or polyphenylenepolymethylenepolyamine);

(c) Oligomeric polyimides, polyamideimides or polyamideimide esters whose ends consist mainly of hydroxyl groups, which are obtained by the reaction metnioned in (b) performed in the presence of an amino alcohol such as 2-amino-2-methylpropane-1,2-diol, or a polyol;

(d) Oligomeric polyamides containing terminal amino groups obtained by reacting polycarboxylic acids with an excess of polyamines;

(e) Oligomeric polyhydantoins containing terminal amino groups obtained by reacting ethyl bis-iminoacetates such as diethyl 4,4'-methylenediphenylenediiminoacetate, an excess of polyamines and diaryl carbonates; and (f) Polyhydantoin esters containing terminal hydroxyl groups obtained by forming oligomeric carboxyl-terminated polyhydantoins, and reacting them with an excess of polyols to esterify the carboxyl groups.

Of these, the polymers (a), (b) and (c) are especially preferred. Generally, the use of component B containing an imide, hydantoin or amide group gives rise to an increase in the thermal stability of a cured product of the polymer composition in accordance with the present invention.

II-4. Component C:

Basically, a cured product of the polymer composition of this invention is obtained by using a reaction between the terminal aryl ester groups of component A and the hydroxyl groups and/or amino groups of component B as a main curing reaction.

By adding a monomeric or oligomeric compound containing terminal groups reactive with the component B and being different from the component A to the polymer composition of this invention, a co-cured product can be obtained as a result of a curing reaction of such a compound together with the component A. By suitably choosing such a compound, cured products with the desired properties can be obtained. The component C which is especially useful is such compound that can be incorporated as a constituent of the polymer composition of this invention.

The component C is a monomeric or solvent-soluble oligomeric cocondensation component which is obtained by reacting at least two compounds belonging to the component 3 in the presence or absence of the component 2 and in which the main chain consists of at least one bond selected from amide, imide, hydantoin and ester bonds and the ends consist of any of (a) to (f) with at least 50 mole% of the entire end groups consisting of a carboxyl group or its functional derivative (including cyclic acid anhydride groups and their ring-opened products). The component C however excludes those which are included within the definition of component A, A' or 3.

At least 50 mole% of the entire end groups of the component C should consist of carboxyl groups or functional derivatives thereof. This is because this limitation leads to good curability in a reaction of these end groups with a hydroxyl group and/or a primary or secondary amino group, and the resulting bond after curing is stable both thermally and chemically. Of the carboxyl groups and functional derivatives thereof, acid anhydride groups, groups obtained by ring-opening the acid anhydride groups with alcohols or water, and active carboxylate ester groups are preferred in view of their reactivity.

Acid halide groups have very high reactivity with hydroxyl and amino groups, but are not preferred because they yield highly corrosive hydrogen halides upon reaction and even at room temperature, cure by reaction with the hydroxyl groups and/or amino groups of the component B), and therefore, it is difficult to obtain stable solvent-soluble polymer compositions.

In order to obtain polymer compositions which are stable at room temperature and can exhibit curability with good efficiency at an elevated temperature, aryl ester groups and ring-opened products of acid anhydride groups are preferred, and the aryl ester groups are especially preferred.

Preferably, such active carboxylic acid derivative groups account for at least 40 mole%, preferably at least 60 mole%, of the entire carboxylic acid-type end groups. The remainder of the carboxylic acid-type end groups may consist of, for example, free carboxylic groups or alkyl carboxylate groups. Remaining end groups other than the carboxylic acid-type end groups may be any groups which do not impair the curability of the polymer composition and do not adversely affect the cured product. Preferred end groups other than the carboxylic acid-type groups are those which will participate in the curing reaction and preferably form stable groups. From this standpoint, the groups (c) to (f) are preferred.

The monomeric component C denotes compounds formed of at least two components and generally having a molecular weight of not more than 1000 and a definite structure. The oligomeric compound denotes a mixture of oligomers generally having a molecular weight of at least 500, which cannot be expressed by a definite structural formula, but can be defined only by a statistic structural formula.

Generally, oligomeric compounds are preferred as the component C.

Typical examples of the monomeric compounds are shown below.

(a) Compounds in which the main chain is an amide bond:

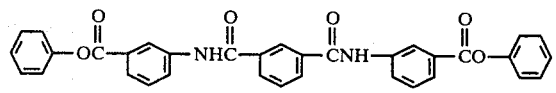

(b) Compounds in which the main chain is an imide bond:

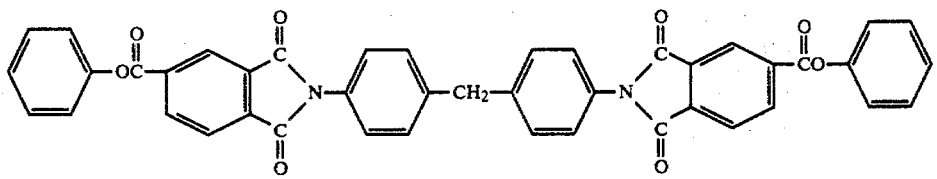

(c) Compounds in which the main chain is hydantoin bond:

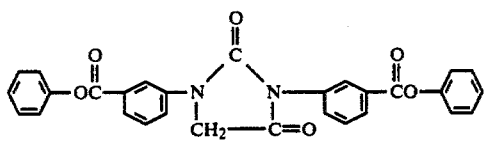

Typical examples of reactions for forming the main chain of the component C are the same as those stated hereinabove with regard to the component B, and these reactions can also be used.

In order to adjust the content of a carboxyl group or its functional derivative to at least 50 mole% of the entire end groups, the carboxyl group or its functional derivative is introduced into the reaction system in an amount exceeding that required for the formation of the main chain.

Of the carboxyl-type end groups, aryl ester groups are especially preferred. The introduction of aryl ester groups can be effected by methods which are classified into two types, i.e. (i) the use of aryl ester groups as the carboxyl derivative group in the component 3, and (ii) the reaction of a carboxyl group or a lower alkyl carboxylate group with an aryl ester-forming agent, preferably the component 2.

When in the method (ii), the component 2 is used as the aryl ester-forming agent, the component 2 may be incorporated at the time of forming the main chain thereby to promote the main chain-forming reaction and the formation of aryl esters. Or it is also possible to add the component 2 after formation of the main chain thereby to convert the terminal carboxyl groups or lower alkyl carboxylate groups to aryl carboxylate groups.

As a special method for introducing aryl ester groups, a carboxylic acid halide may be used as the carboxyl derivative group to form terminal carboxylic acid halide groups, which are reacted with phenols. However, this is not a suitable method because it yields hydrogen halide as a by-product.

Preferred compounds as component C are oligomers in which at least 50 mole% of the entire end groups consist of carboxyl groups or functional derivatives thereof, at least 40 mole%, preferably at least 60 mole%, of the carboxyl-type end groups are aryl ester groups, and the main chain is composed of at least one bond selected from amide, imide, hydantoin and ester bonds. Examples of such oligomers are shown below.

(a) Oligomeric polyamideimides containing terminal aryl ester groups obtained by reacting aryl esters of tricarboxylic anhydrides or their ring-opened products (for example, a 4-phenyl ester of trimellitic anhydride) with polyamines (for example, 4,4'-diaminodiphenylmethane, metaphenylenediamine or hexamethylenediamine), the former being used in excess moles.

In this case, a part (not exceeding the moles of the polyamine) of the aryl ester of a tricarboxylic acid anhydride or its ring-opened product can be replaced by a tetracarboxylic acid dianhydride or its ring-opened product (for example, pyromellitic dianhydride, or benzophenonetetracarboxylic dianhydride) and/or a polycarboxylic acid (for example, terephthalic acid or isophthalic acid).

(b) Oligomeric polyamideimides containing terminal aryl ester groups obtained by reacting tricarboxylic acid anhydrides or their ring-opened products (for example, trimellitic anhydride), monoaryl ester anhydrides of tricarboxylic acid anhydrides and/or monoaryl esters of dibasic acids (for example, monophenyl terephthalate or 4-hydroxycarbonyl-N-(3-carboxyphenyl)phthalimide), with polyisocyanates (for example, diphenylmethane 4,4'-diisocyanate or toluylene diisocyanate) containing isocyanate groups the amount of which is nearly equal to the total moles of the above compounds (carboxylic acid, cyclic acid anhydride and/or its ring-opened product). In this case, a part of the tricarboxylic acid anhydride or its ring-opened product can be replaced by a tetracarboxylic acid dianhydride or its ring-opened product and/or a polycarboxylic acid.

(c) Oligomeric polyimides obtained by reacting tetracarboxylic dianhydrides or their ring-opened products and monoaryl esters of tricarboxylic acid anhydrides with polyamines or polyisocyanates containing amino groups or isocyanate groups the amount of which is nearly equal to the total moles of the cyclic acid anhydride or its ring-opened product.

(d) Oligomeric polyamideimides containing terminal aryl ester groups obtained by reacting tricarboxylic acid anhydrides or their ring-opened products, the former being used in excessive moles, in which reaction an aryl ester-forming agent (for example, diphenyl carbonate) is added at the early stage of the reaction or during the reaction thereby to promote the formation of the main chain and simultaneously convert the carboxylic acid to its aryl ester. In this method, a part (not exceeding the moles of the polyamine) of the tricarboxylic acid anhydride or its ring-opened product can be replaced by a polycarboxylic acid and/or tetracarboxylic anhydride or its ring-opened product.

(e) Oligomeric polyhydantoins containing terminal aryl ester groups obtained by reacting ethyl bis-iminoacetate compounds (for example, diethyl 4,4'-methylenediphenylene diiminoacetate), polyamines and component 2 (for example, diphenyl carbonate), the amount of the ethyl bis-iminoacetate compound being in excess in moles of the polyamine, in which reaction an aminocarboxylic acid or its lower alkyl or aryl ester (for example, m-aminobenzoic acid) is added in an amount corresponding to the moles of the ethyl iminoacetate group.

(f) Oligomeric polyamideimides obtained by reacting tricarboxylic acid anhydrides or their ring-opened products with polyisocyanates with the former being used in excess moles, to form oligomeric polyamideimides containing carboxyl-type terminal groups, and then reacting them with aryl ester-forming agents to convert the carboxylic acid to its aryl ester. In this method, a part (not exceeding the moles of the polyisocyanate) of the tricarboxylic acid anhydride or its ring-opened product may be replaced by a polycarboxylic acid and/or a tetracarboxylic acid dianhydride or its ring-opened product.

(g) Oligomeric polyhydantoins containing terminal aryl ester groups obtained by reacting ethyl bis-iminoacetates with an excess of polyisocyanates, in which reaction phenyl iminoacetocarboxylates (for example, ethyl m-iminoacetate-phenyl benzoate) containing iminoacetic acid groups in an amount nearly equal to the moles of the excess isocyanate groups are added.

(h) Oligomeric polyamides obtained by reacting diaryl esters of polycarboxylic acids (for example, diaryl terephthalates, diaryl isophthalates, or tridiaryl trimesates) with polyamines with the former being used in excess moles.

(i) Oligomeric polyamideimide esters obtained by reacting tricarboxylic acid anhydride monoaryl esters, polyamines and polyols [for example, ethylene glycol or tris-(β-hydroxyethyl)isocyanurate], the amount of the tricarboxylic acid anhydride aryl ester or its ring-opened product being in excess in moles of the total moles of the polyamines and polyamines.

(j) Oligomeric polyamide esters obtained by reacting diaryl esters of polycarboxylic acids, polyols and polyamines, the amount of the diaryl polycarboxylates being in excess in moles of the sum of the moles of the polyols and polyamines.

(k) Oligomeric polyamideimides obtained by reacting polycarboxylic acids and/or tricarboxylic anhydrides with an equimolar or excessive amount of polyamines to form amino-terminated oligomers, and reacting them with tricarboxylic acid anhydride monoaryl esters containing acid anhydride groups equal to the amino groups. In this case, the residual carboxyl groups can be combined with polyisocyanates.

(l) Oligomeric polyimides obtained by reacting tetracarboxylic acid dianhydrides or their ring-opened products with polyamines or polyisocyanates, the amount of the former being used in excess moles with respect to the latter, in the presence of phenyl aminocarboxylates containing amino groups (for example, phenyl m-aminobenzoate) or isocyanate carboxylic acid phenyl esters containing isocyanate groups (for example, m-isocyanate-phenyl benzoate).

In order to increase the thermal stability of a cured product of the polymer composition of this invention, it is preferred to use those compounds of which main chain consists of at least one of imide, hydantoin, and amide bonds as the component C. Especially preferred species are oligomers prepared by using derivatives of tricarboxylic acid anhydrides as component 3 and containing a main chain composed mainly of an amideimide bond. The method of preparing such oligomers containing aryl ester groups at the ends is described in detail in U.S. Pat. No. 3,829,399 to the same inventors as in the present application.

The degree of polymerization of the oligomers as component C is such that it does not give a fully flexible film by casting and drying it alone. Usually, such oligomers have an inherent viscosity, as measured on a solution of the oligomer in N-methylpyrrolidone, sulfuric acid or m-cresol in a concentration of 0.5 g/100 ml. at 30° C., of 0.01 to 0.45, preferably 0.05 to 0.350.

The polymer as component C does not necessarily have to be linear, and so long as it is soluble in solvents, it may contain a branched structure. Analysis of the end groups of the polymer can be made in accordance with the methods already given hereinabove.

II-5. Components D and D':

The component D is a mixture of the component A and/or A' with component C. The ratio between the component A and/or A' and the component C may be varied over a wide range according to the purposes and the desired properties. For example, when the proportion of the component A and/or A' is increased, the polyester portion increases, and the resulting composition exhibits properties similar to polyesters, but the addition of a suitable component C can remedy the defects of polyesters, for example, thermal stability and abrasion resistance.

On the other hand, if the proportion of component C is increased, the addition of the component A and/or A' leads to the improvement of the properties of a cured product of component C, although it depends upon the structure of component C. By properly varying the mixing ratio, the desired properties can be obtained. Accordingly, the mixing ratio is selected properly according to the desired properties for end uses, and it is generally advantageous that 95 to 5 parts by weight of the component A and/or A' is used per 5 to 95 parts by weight of the component C (the total amount being 100 parts by weight), and preferably, 85 to 15 parts by weight of the former is used per 15 to 85 parts by weight of the latter (the total amount being 100 parts by weight).

Component D' is a reaction product formed between the component A and the component C as a result of performing the reactions of forming the component A and the component C in the same reactor either simultaneously or in an optional sequence.

The component D' can be prepared at low cost by a simple manufacturing process because it is not necessary to prepare the component A and/or component A' separately from the component C but they can be formed in the same reactor, and moreover, it is not necessary to isolate one component formed or store it in another vessel in order to prepare the other.

Furthermore, by reacting at least two species of component 3 and component 1 and component 2 either simultaneously or in an optional order, the component 1 or component A and/or component A' may react in the reaction system with the component 3 or its reaction product (component C), and the component A and/or A' and the component C together form a main chain linkage. This affords a product of good quality which differs from a mere mixture in regard to strength and the uniformity of properties.

Furthermore, when the component 2 is used in the formation of component C, this reaction can be performed together with the reaction of forming component A and/or A' in which component 2 is also used. This can shorten the time required for producing the components A and/or A' and C. If desired, the amount of component 2 can be decreased.

Component D' can be formed, for example, by the following methods.

(1) A method which comprises reacting at least two species of component 3 in the optional presence of component 2 to form component C, and reacting the components 1 and 2 in the same system, thereby to form component D' while forming the component A.

(2) A method which comprises adding at least two species of component 3, the component 1 and the component 2 simultaneously and reacting them to form component D'.

(3) A method which comprises reacting the component 1 and 2 in the optional presence of component 3, and then reacting the reaction product with at least two species of component 3 while, if desired, adding the component 2.

Of these, the methods (1) and (2) are suitably used, and the method (1) is especially preferred.

When the component 2 is used not only for forming the component A but also for forming the component C, the amount required of the component 2 can be stoichiometrically calculated.

The reaction conditions for forming the component D' can be chosen as desired in accordance with those employed in the preparation of component A and component C described hereinabove.

The preferred mixing ratios are the same as those described with regard to the component D, and can be selected as desired according to the desired properties for end uses.

Analysis of the end groups can be made in accordance with the methods already described hereinabove.

Preferred end groups are substantially the same as those described with regard to the components A and C. Preferably, the component D' contains terminal aryl ester groups in an amount of at least 30 mole% of the entire end groups.

The degree of polymerization and solubility of component D and D' are the same as in the case of the components A and C.

II-6. Polymer composition

The polymer composition of this invention can be obtained by mixing or partially reacting the desired components A and D' mentioned above. The partial reaction means that the components are pre-reacted to some extent before curing while they still retain their solubility and/or fusibility, in order to raise the efficiency of curing.

Typical make-ups of the compositions of this invention are schematically shown below.

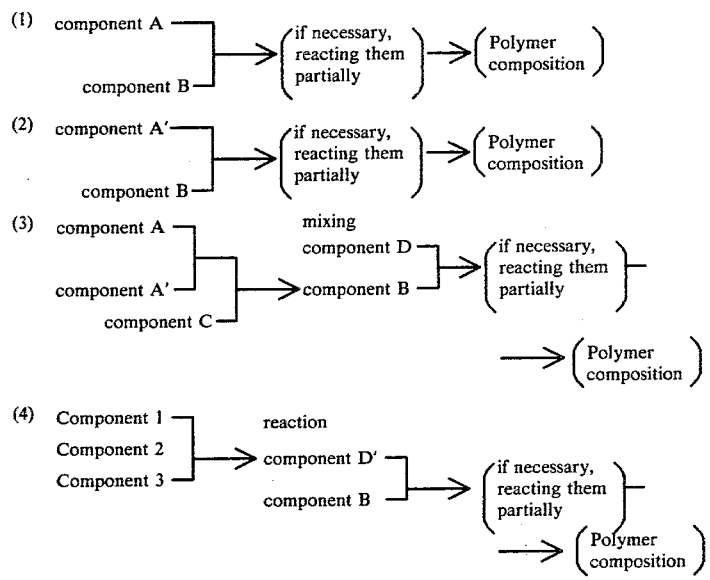

The ratio between at least one of components A, A', D and D' and the component B significantly affects the curability of the resulting polymer composition and the properties of the cured composition.

Theoretically, the ratio is preferably such that the functional groups contained in the components react with each other and are completely consumed. However, in actual curing reactions, it is impossible for all reactive functional groups to react completely. Accordingly, a trifunctional or higher component is partly added so that a cured product of a sufficiently high molecular weight can be obtained even when the unreacted matter remains partly. Accordingly, the recipe is frequently such that functional groups contained mainly in a trifunctional or higher component become excessive. Preferably, component B is used as such a trifunctional or higher component to produce the polymer composition of this invention, because undesirable phenomena, such as gellation, do not occur in the production of component A, A' or D'.

Accordingly, in most cases, the mixing ratio for use in preparing the compositions of this invention is such that the total number of hydroxyl groups and/or primary and secondary amino groups in the component B or the total number of hydroxyl groups and/or primary and secondary amino groups of the components A', D and D' (if they have these groups) and hydroxyl groups and/or primary and secondary amino groups in the component B is not less than the total number of carboxyl groups and/or derivatives thereof in the components A, A', D and D'. Especially preferably, the mixing ratio is such that the total number of such hydroxyl groups and/or primary and secondary amino groups is not less than the total number of aryl carboxylate groups in the components A, A', D and D'. The advantageous molar ratio between the two is such that the proportion of the former is 100 to 250 mole%, especially 110 to 180 mole%, based on the latter.

The partial reaction is carried out generally at a temperature of 70° to 200° C. although it varies according to the types of the components to be combined. When the partial reaction proceeds, the degree of polymerization of the polymer in the composition generally increases, and the composition sometimes becomes difficult to mold. The partial reaction conditions are preferably chosen so that the moldability and curability of the composition can be well balanced according to the desired end uses.

As will be described below, when a solvent is added to the composition in order to use it as a liquid polymer composition, it is preferred to heat and partially react it in the form of a solution in such a solvent.

[III] CHARACTERISTICS AND USES OF THE POLYMER COMPOSITIONS

The polymer composition of this invention can be molded into a desired shape by heating it, preferably to the molten state. Since the composition is soluble in solvents, it can be made into a molding composition in a solution form by dissolving it in a non-reactive organic solvent. The composition in the solution form can be coated or formed into a desired shape, and heated to a cured molded product.

Suitable solvents for preparing such molding compositions in the solution form include, for example, disubstituted amides, sulfones or sulfoxides, and phenols as exemplified under (1), (2) and (7) respectively in paragraph I-5 above because they have high solubilizing power and are easily separated from the cured shaped articles after curing. It is also possible to mix such solvents with other solvents to an extent such that they do not cause the separation of the above polymers.

Advantageously, the molding compositions in accordance with this invention further comprise a suitable amount of a curing catalyst. Catalysts exemplified hereinabove in paragraph I-6 can be used as such curing catalysts. Preferred curing catalysts are those which can promote a reaction of aryl carboxylate groups with hydroxyl groups and/or amino groups in the component B. Examples of suitable curing catalysts are oxides, hydroxides, organic acid salts, alcoholates, and organic complexes of metals such as titanium, zirconium, tin, lead, zinc, cobalt, manganese, antimony, or germanium. Alcoholates and organic acid salts of titanium, tin, lead, and zinc are especially preferred.

The suitable amount of the curing catalyst is usually 0.005 to 15% by weight, especially 0.5 to 10% by weight, based on the polymer composition.

The molding compositions of this invention may further contain minor amounts of other resins such as phenolic resins, amino resins such as melamine-formaldehyde resins and urea-formaldehyde resins, polyamide resins, polyimide resins, polyester resins, resins, and polyester-imide resins.

In order to increase the curability of the molding composition of this invention, the composition may further contain aryl esters of polycarboxylic acids such as diphenyl isophthalate, diphenyl terephthalate, diphenyl naphthalenedicarboxylate, triphenyl trimellitate, triphenyl trimesate or tetraphenyl pyromellitate, stabilized polyisocyanates such as Desmodur ® AP stable and Millionate ® MS-50 (manufactured by Nippon Polyurethane Co., Ltd.); aryloxytriazines such as triphenoxytriazine; polymethylole melamine; polyalkoxysilanes, etc.

The compositions of this invention are especially suitable for use in the form of solution in such applications as coating, especially electric wire and cable coating.

When the composition of this invention is used as a liquid composition for such coating purposes, it is preferred that its non-volatile content (solids content) be adjusted to 5–70% by weight.

The molding composition of this invention is preferably cured during or after molding. The suitable curing temperature is generally 150° to 500° C., especially 200° to 500° C.

The molding composition of this invention has superior workability in molding and curing, and the resulting cured product has well-balanced properties of high utilitarian values, such as hardness, flexibility, abrasion resistance, intimate contact, thermal stability and chemical resistance. These compositions can be used in a wide range of applications, for example, electric insulations as wire enamel and impregnating varnish, protective or decorative coating of aluminum-make appliances and heaters, and as adhesives, and also for preparing laminate sheets.

When the liquid molding composition of this invention is used for example as a wire-enamelling varnish for forming insulated electric wires, it is possible to provide electric wires of grades B to C having superior electrically insulating properties. Better properties could be obtained in this case by applying a coating of another resin together with the coating of the above composition of this invention.

In the form of a powder, the molding composition of this invention can be used, either alone or as a mixture with another resin, as powder paints or hot-melt sealants, and can also be formed into molded articles by compression molding or transfer molding. Such molded products can be used in industrial uses which require electrically insulating characteristics, mechanical properties and thermal stability, for example, as machine parts or electrically insulated component parts.

The following Referential Examples and Examples further illustrate the present invention.

In the Examples, the inherent viscosity $[\eta_{inh}]$ is one calculated from the value as measured at 30° C. on a solution of the polymer in N-methylpyrrolidone or m-cresol having a concentration of 0.5 g polymer in 100 ml of the solution.

REFERENTIAL EXAMPLE 1

500 g of film-forming polyethylene terephthalate chips (with an intrinsic viscosity of 0.64), 100 g of diphenyl carbonate and 3 g of tetrabutyl titanate were placed in a vessel, and heated in a stream of nitrogen for two hours with stirring at a bath temperature of 230° to 250° C. At an early stage after heating, the reaction mixture became homogeneous, and the reaction proceeded in this state. During the reaction, a liquid compound distilled out. This compound was found to consist of phenol and ethylene carbonate as a result of gas-chromatographic analysis. After the reaction, 820 g of cresol was added.

For the analysis of the reaction product, a part of the resulting solution was taken out and washed with methanol to separate the product. Its inherent viscosity, as measured in cresol, of the product was 0.16. The infrared absorption spectrum of the reaction product showed absorptions at 750, 1080, 1190, 1480 and 1590 cm$^{-1}$ in addition to those observed in the infrared absorption spectrum of polyethylene terephthalate.

On the other hand, as model substances, 32 g (0.10 mole) of diphenyl terephthalate, 5.8 g (0.09 mole) of dehydrated ethylene glycol and 0.05 g of tetrabutyl titanate were reacted for 8 hours under reflux. The resulting product had an inherent viscosity of 0.11. Since diphenyl terephthalate was reacted in excess moles, the ends of this product contained residual phenyl ester groups. The infrared absorption spectrum of this product showed absorptions at 750, 1080, 1190, 1480 and 1590 cm$^{-1}$ in addition to the characteristic absorptions of polyethylene terephthalate. These absorptions were found to be attributable to the terminal phenyl ester groups.

It can be seen from the above that phenyl ester groups are present in the ends of the low-molecular-weight polymer resulting from the depolymerization of polyethylene terephthalate with diphenyl carbonate.

In order to analyze the terminal carboxyl groups of the reaction product (1) quantitatively, the reaction product was dissolved in N-methyl pyrrolidone, and the solution was subjected to potentiometric titration with an isopropyl alcohol solution with 1/10 N KOH. It was found that the amount of the terminal carboxyl groups was $2.0 \times 10^{-4}$ mole/g.

A quantitative analysis of the terminal hydroxyl groups was performed by the following method.

The reaction product was dissolved in α-methyl naphthalene, and succinic anhydride was added. The reaction was performed at 155° C. for 3 hours. The terminal carboxyl groups of the reaction product were titrated with sodium hydroxide, and the increase of these groups from those of the untreated product was calculated as terminal hydroxyl groups. The quantity of the terminal hydroxyl groups determined was $0.3 \times 10^{-4}$ mole/g.

In order to determine the terminal phenyl ester groups quantitatively, the reaction product is added to a 2 N aqueous solution of sodium hydroxide, and hydrolyzed at a temperature of 80° to 90° C. for 48 hours. The freed phenol was quantitatively determined by a bromine method, and its amount was found to be $9.0 \times 10^{-4}$ mole/g.

Accordingly, the amount of phenyl carboxylate in the entire terminal groups was found to be 80 mole%.

When this solution was coated on a glass plate, preheated at 140° C. for 1 hour, and baked at 250° C. for 10 minutes, a self-supporting film could not be obtained.

REFERENTIAL EXAMPLE 2

1000 g of film-forming polyethylene terephthalate chips (having an intrinsic viscosity of 0.64), 500 g of diphenyl carbonate and 8 g of tetrabutyl titanate were placed in a vessel, and heated for 2 hours with stirring in an atmosphere of nitrogen at a bath temperature of 220° to 240° C. At an early stage after heating, the reaction mixture became a homogeneous system. After the reaction, the reaction mixture was washed with methanol to afford 1090 g of a white powdery product. The product had an inherent viscosity, as measured in m-cresol, of 0.13. The infrared absorption spectrum of the product showed absorptions at 750, 1080, 1190, 1480 and 1590 cm$^{-1}$ which are characteristic absorptions attributable to the terminal phenyl ester groups.

As a result of the terminal group determination, the amount of the terminal carboxyl groups was found to be $1.8 \times 10^{-4}$ mole/g.

By the gel permeation chromatography of this reaction product, it was found to have an average molecular weight of 979.

Ethylene carbonate formed as a by-product during the depolymerization of polyethylene terephthalate with diphenyl carbonate was considered to be derived from the ethylene glycol component of the polyethylene terephthalate chain. As a result of this depolymerization reaction, carboxyl-type terminal groups remain at the ends of the polyester. When the depolymerization proceeded to a sufficient degree, the amount of hydroxyl groups was very small, and the ends were considered to consist almost solely of carboxyl-type terminal groups whose amount was determined to be $20 \times 10^{-4}$ mole/g.

The difference between this amount of total carboxyl groups and the measured amount of terminal carboxyl groups must be the amount of the terminal phenyl carboxylate groups. Thus, the amount of the phenyl carboxylate determined from this was $18 \times 10^{-4}$ mole/g, and the proportion of the phenyl carboxylate in the entire terminal groups was calculated as 90 mole%.

REFERENTIAL EXAMPLE 3

In the same way as in Referential Example 2, 1000 g of film-forming polyethylene terephthalate, 600 g of diphenyl carbonate and 8 g of tetrabutyl titanate were placed in a vessel, and reacted in a stream of nitrogen at a bath temperature of 200° to 240° C.

After the reaction, the reaction product was washed with methanol to afford 1120 g of a white powdery product. The product had an inherent viscosity, as measured in m-cresol, of 0.11. The concentration of the terminal carboxyl groups was $2.1 \times 10^{-4}$ mole/g, and as a result of the gel permeation chromatography of the product, this low-molecular-weight polyester was found to have an average molecular weight of 883.

As a result, the proportion of the terminal phenyl carboxylate was calculated as 91 mole%.

REFERENTIAL EXAMPLE 4

50 g of film-forming polyethylene terephthalate chips, 2.0 g of diphenyl carbonate and 2 g of tetrabutyl titanate were placed in a vessel, and reacted in a stream of nitrogen with the temperature of the bath maintained at 200° to 240° C. The reaction mixture did not become homogeneous even after 4 hours. 50 g of phenol was added, and the reaction was continued for an additional 2 hours at the same temperature, when the reaction mixture became homogeneous in the heated state assuming a reddish brown color. Methanol was added to isolate the reaction product. The infrared absorption spectrum of this product showed slight phenyl carboxylate absorptions at 750, 1080 and 1480 cm$^{-1}$. The product had an inherent viscosity, as measured in m-cresol, of 0.24. As a result of the terminal group determination, it was found that the concentration of terminal hydroxyl groups was $2.0 \times 10^{-4}$ mole/g, the concentration of terminal carboxyl groups was $3.2 \times 10^{-4}$ mole/g, and the concentration of terminal phenyl ester groups was $0.7 \times 10^{-4}$ mole/g. The proportion of the terminal phenyl ester groups based on the entire terminal groups was about 12 mole%.

REFERENTIAL EXAMPLE 5

200 g of film-forming polyethylene-2,6-naphthalenedicarboxylate, 80 g of diphenyl carbonate and 1 g of tetrabutyl titanate were placed in a vessel, and reacted for 3 hours in a stream of nitrogen with stirring at a bath temperature of 220° to 240° C. For a long time, the reaction mixture remained heterogeneous, but finally, it became homogeneous. After the reaction, 460 g of cresol was added. The resulting product had an inherent viscosity, as measured in m-cresol, of 0.08.

The infrared absorption spectrum of the product showed a characteristic absorption at 750 cm$^{-1}$ attributable to the terminal phenyl ester group. The amount of the terminal carboxyl groups was analyzed, and found to be $2.9 \times 10^{-4}$ mole/g, and the average molecular weight of the product measured by gel permeation chromatography was 1064.

It can be presumed that when the decomposition has sufficiently proceeded, the ends of the product consist almost solely of carboxyl-type groups. Accordingly, the proportion of the terminal phenyl carboxylate groups based on the entire end groups was calculated as 85 mole%.

REFERENTIAL EXAMPLE 6

100 g of molding polytetramethylene terephthalate chips, 50 g of diphenyl carbonate and 1 g of tetrabutyl titanate were placed in a vessel, and reacted under the same conditions as in Example 1. The reaction product was washed with methanol to afford a light yellowish gray flaky product. The product had an inherent viscosity, as measured in m-cresol, of 0.07. The infrared absorption spectrum of the product showed characteristic absorptions at 750, 910, 1080, 1190 and 1480 cm$^{-1}$ attributable to the terminal phenyl ester group.

The concentration of terminal carboxylate groups was found to be $3.7 \times 10^{-4}$ mole/g. The product had an average molecular weight of 910 as a result of gel permeation chromatography.

As a result, the proportion of the terminal phenyl carboxylate groups was calculated as 83 mole% based on the entire end groups.

REFERENTIAL EXAMPLE 7

100 g of filmy polyethylene terephthalate, 20 g of isophthalic acid, 70 g of diphenyl carbonate and 2 g of tetrabutyl titanate were placed in a vessel, and reacted for 4 hours in a stream of nitrogen with stirring at a bath temperature of 220° to 240° C. After the reaction, 140 g of cresol was added to dilute the reaction product. A part of the resulting solution was washed with methanol, to separate the product. The product was found to have an inherent viscosity, as measured in m-cresol, of 0.11. The infrared absorption spectrum of the product showed characteric absorptions at 750, 910 and 1190 cm$^{-1}$ ascribable to the terminal phenyl ester group.

The concentrations of the terminal carboxyl groups, phenyl carboxylate groups and hydroxyl groups were found to be $1.1 \times 10^{-4}$, $2.8 \times 10^{-4}$, and $0.2 \times 10^{-4}$ mole/g, respectively. Thus, the proportion of the terminal phenyl carboxylate groups was found to be 68 mole% based on the entire end groups.

REFERENTIAL EXAMPLE 8

192 g of trimellitic anhydride, 99 g of 4,4'-diaminodiphenylmethane and 100 g of phenol were placed in a vessel, and reacted for 2 hours in a stream of nitrogen with stirring at a bath temperature of 180° to 200° C. The by-product water was distilled off by forming an azeotrope with xylene. During the reaction, a yellow solid precipitated in the system. Thus, diimidodicarboxylic acid was obtained. Then, 400 g of polyethylene terephthalate chips, 250 g of diphenyl carbonate and 1 g of tetrabutyl titanate were added, and reacted for 4 hours with the temperature of the bath maintained at 220° to 240° C. The reaction mixture became homogeneous assuming a reddish brown color in about 1 hour. After the reaction, 700 g of cresol was added to dilute the reaction product. A part of the solution was taken and washed with methanol to separate the product. The product had an inherent viscosity, as measured in N-methyl pyrrolidone of 0.10. The infrared absorption spectrum of this product showed characteristic absorptions ascribable to the 4-phenoxycarbonylphthalimide group at 1285 cm$^{-1}$ and characteristic absorptions ascribable to the terminal phenyl ester groups at 750 cm$^{-1}$.

The terminal groups were quantitatively analyzed in the same way as in Referential Example 7. It was found that the proportion of the terminal phenyl carboxylate groups was 62 mole% based on the entire end groups.

REFERENTIAL EXAMPLE 9

50 g of polyethylene terephthalate scrap (having an inherent viscosity of 0.81) occurring in the manufacture of fiber-forming polyethylene terephthalate, 35 g of diphenyl carbonate and 0.2 g of tetrabutyl titanate were placed in a vessel, and reacted for 2 hours in a stream of nitrogen at a bath temperature of 220° to 240° C. After the reaction, the reaction product was washed with methanol, to afford 57 g of a light yellow powder. The product had an inherent viscosity, as measured in m-cresol, of 0.09. As a result of the measurement of the average molecular weight of the product by gel permeation chromatography and the quantitative analysis of the terminal carboxyl groups, the proportion of the terminal phenyl ester groups based on the entire end groups was found to be 74 mole%.

REFERENTIAL EXAMPLE 10

222 g of diphenyl terephthalate, 95 g of diphenyl isophthalate, 47 g of ethylene glycol, 10 g of glycerine and 1.0 g of zinc acetate were placed in a vessel, and reacted for 2 hours in a stream of nitrogen with stirring at a bath temperature of 180° to 220° C. After the reaction, a part of the reaction product was taken out and washed with a small amount of methanol to isolate the reaction product. To the remaining reaction mixture 370 g of cresol was added to form a uniform solution.

The product had an inherent viscosity, as measured in m-cresol, of 0.13. As a result of the terminal group determination, the concentration of the terminal hydroxyl groups and the terminal phenyl ester groups were $2.1 \times 10^{-4}$ mole/g and $14.8 \times 10^{-4}$ mole/g, respectively. The proportion of the terminal phenyl ester groups based on the entire end groups was found to be 87 mole%.

REFERENTIAL EXAMPLE 11

169 g of diphenyldicarboxylic acid, 50 g of isophthalic acid, 50 g of ethylene glycol, 9.2 g of glycerine and 1.0 g of lead acetate were placed in a vessel, and reacted for 4 hours at a bath temperature of 220° to 240° C. Then, they were reacted at 320° C. for 4 hours at reduced pressure. The resulting polyester had an inherent viscosity, as measured in m-cresol, of 0.10.

21 g of diphenyl carbonate and 1 g of tetrabutyl titanate were added to the resulting polyester, and they were reacted at 220° to 240° C. for 1 hour. After the reaction, the reaction product was taken out and washed with a small amount of methanol to isolate it. The reaction product had an inherent viscosity, as measured in m-cresol, of 0.08. The infrared absorption spectrum of the reaction product showed absorptions at 1080, 1190, 1480, and 1590 cm$^{-1}$ ascribable to the terminal phenyl ester groups.

As a result of the terminal group determination, it was found that the concentrations of the terminal carboxyl groups, terminal phenyl ester groups and terminal hydroxyl groups were $2.1 \times 10^{-4}$ mole/g, $2.6 \times 10^{-4}$ mole/g, and $0.2 \times 10^{-4}$ mole/g, respectively. Accordingly, the proportion of the terminal phenyl ester groups based on the entire end groups was 53 mole%.

REFERENTIAL EXAMPLE 12

50 g of fiber-forming polyethylene terephthalate chips (with an intrinsic viscosity of 0.86), 41 g of diphenyl terephthalate and 1 g of tetrabutyl titanate were placed in a vessel, and the temperature of the bath was raised to 220° to 250° C. in a stream of nitrogen. When the temperature of the bath exceeded 200° C., the reaction mixture began to dissolve. In about 1 hour, it became a reddish brown uniform solution. In this state, the reaction was continued for 4 hours. After the reaction, a part of the reaction mixture was taken out and washed with a small amount of methanol to isolate the reaction product. 80 g of cresol was added to the residue to form a uniform solution.

The product had an inherent viscosity, in m-cresol, of 0.09. The infrared absorption spectrum of the product showed absorptions at 750, 1190, 1480 and 1590 cm$^{-1}$. At 750, 1480 and 1590 cm$^{-1}$, the terminal phenyl ester absorption and the diphenyl terephthalate absorption overlapped, but at 1190 cm$^{-1}$, the absorption was attributable only to the terminal phenyl ester of the oligomeric polyester. The presence of the absorption at 1190 cm$^{-1}$ shows that the polyester was decomposed to form terminal phenyl ester groups.

The reaction product obtained contained unreacted diphenyl terephthalate mixed therewith. But since the diphenyl terephthalate has high reactivity with the curing agent, the reaction product can be used in the subsequent reaction without isolating the diphenyl terephthalate.

As a result of the terminal group analysis, it was found that the proportion of the terminal phenyl ester groups based on the entire end groups was 67 mole%.

REFERENTIAL EXAMPLE 13

50 g of polyethylene terephthalate recovered from the used photographic films was cut to fine sizes, and placed in a vessel. 20 g of glycerine and 0.2 g of dibutyltin oxide were added, and the mixture was heated to a bath temperature of 230° to 250° C. The film pieces remained in the reaction system, but finally the reaction system became a uniform liquid while hot. The reaction was performed for 15 hours in total, and the excess glycerine was removed at reduced pressure.

15 g of diphenyl carbonate and 0.2 g of tetrabutyl titanate were added to the reaction mixture, and the mixture was reacted for two hours with the temperature of the bath maintained at 230° to 240° C. After the reaction, the product was washed with a small amount of methanol to afford 43 g of a white product. The product had an inherent viscosity, in m-cresol, of 0.10. The infrared absorption spectrum of the product showed absorptions at 750, 1080, 1190, 1480, and 1590 cm$^{-1}$ attributable to the terminal phenyl ester groups. As a result of the terminal group determination, it was found that the proportion of the terminal phenyl ester groups based on the entire end groups was 33 mole%.

REFERENTIAL EXAMPLE 14

100 g of film-forming polyethylene terephthalate chips, 10.0 g of 4,4'-diaminodiphenylmethane, 45 g of diphenyl carbonate and 1.0 g of tetrabutyl titanate were placed in a vessel, and reacted for 4 hours in a stream of nitrogen with stirring at a bath temperature of 220° to 240° C. After the reaction, the reaction mixture was washed with a small amount of methanol to afford 121 g of the reaction product which had an inherent viscosity, in m-cresol, of 0.15. The infrared absorption spectrum of the product showed a absorptions in the vicinity of 1660 cm$^{-1}$ ascribable to the carbonyl group of an amide or urethane group in addition to terminal phenyl ester absorptions.

As a result of the terminal group analysis, the concentrations of the terminal carboxyl groups, terminal phenyl ester groups and terminal hydroxyl groups were found to be $1.8 \times 10^{-4}$ mole/g, $16 \times 10^{-4}$ mole/g, and $0.5 \times 10^{-4}$ mole/g, respectively.

The terminal amino group concentration was determined by dissolving the reaction product in m-cresol and subjecting the solution to potentiometric titration with a 1/20 N hydrochloric acid-alcohol solution. As a result, the terminal amino group concentration was found to be $0.5 \times 10^{-4}$ mole/g. Since the amino group easily reacts with the diaryl carbonate and is converted to a urethane group, the ends of the reaction product also contained urethane groups.

The terminal urethane group concentration was determined by dissolving the reaction product in N-methyl pyrrolidone, adding di-n-butylamine to the solution, performing the reaction at 100° C. for 1 hour, and calculating the terminal urethane group concentration from the amount descreased of di-n-butylamine. It was found to be $1.1 \times 10^{-4}$ mole/g. In this determination method, there is a possibility that the amount of urethane groups contained in the main chain will also be involved.

Consequently, the proportion of the terminal phenyl ester groups based on the entire end groups was about 80 mole%.

REFERENTIAL EXAMPLE 15

100 g of polyethylene(terephthalate-isophthalate) copolymer chips (the ratio of the terephthalate unit to the isophthalate unit=80:20), 34 g of phenol-stabilized, 4,4'-diphenylether diisocyanate, 25 g of diphenyl carbonate, and 2 g of tetrabutyl titanate were placed in a vessel, and reacted for 4 hours with stirring in a stream of nitrogen at a temperature of 230° to 240° C. After the reaction, 130 g of cresol was added to form a uniform solution.

A part of the solution was taken and added to methanol to isolate the reaction product. The reaction product had an inherent viscosity, in m-cresol, of 0.11, and the infrared absorption spectrum of the reaction product showed characteristic absorptions in the vicinity of 1660 cm$^{-1}$ ascribable to the carbonyl group of amide or urethane in addition to the absorptions ascribable to the terminal phenyl ester groups. The terminal groups were analyzed in the same way as in Example 14, and the proportion of the terminal phenyl ester groups based on the entire end groups was found to be about 60 mole%.

REFERENTIAL EXAMPLE 16

338 g of dimethyl terephthalate, 112 g of ethylene glycol, 212 g of tris-(β-hydroxyethyl)isocyanurate and xylene were placed in a vessel, and 2 g of lead acetate was added. The mixture was heated for about 9 hours in a stream of nitrogen at a bath temperature of 110° to 160° C. When the distillation of methanol almost ended, the temperature of the bath was raised to 200° to 240° C., and the mixture was heated for about 6 hours. After the reaction 650 g of cresol was added.

REFERENTIAL EXAMPLE 17

155.2 g of dimethyl terephthalate, 37.2 g of ethylene glycol and 9.2 g of glycerine were placed in a vessel, and 1.0 g of zinc acetate was added. The mixture was heated for about 9 hours in a stream of nitrogen at a bath temperature of 110° to 160° C. When the distillation of methanol almost ended, the temperature of the bath was raised to 200° to 240° C. Then, the mixture was heated for about 6 hours, and then 150 g of cresol was added. The resulting polyester had an inherent viscosity, in m-cresol, of 0.12.

REFERENTIAL EXAMPLE 18

50 g of the same film-forming polyester as used in Referential Example 1, 1.30 g of dimethyl terephthalate, 0.2 g of tetrabutyl titanate and 50 g of phenol were placed in a vessel, and the mixture was heated in a stream of nitrogen for 15 hours in total while raising the temperature slowly from 120° to 200° C. After the reaction, the reaction solution was added to methanol to obtain a powder. The resulting powdery product had an inherent viscosity, in cresol, of 0.14. The infrared absorption spectrum of the product scarcely showed an absorption at 750 cm$^{-1}$ attributable to a monosubstituted phenyl.

REFERENTIAL EXAMPLE 19

An autoclave was charged with 80 g of film-forming polyethylene terephthalate chips and 30 g of ethanol, and closed. The polyester was decomposed with the alcohol at a reaction temperature of 270° C. for 1 hour to afford a low-molecular-weight polyester. The decomposition product had an inherent viscosity, in m-cresol, of 0.18.

REFERENTIAL EXAMPLE 20

26.8 g of 4-phenyl trimellitate, 1,2-anhydride, 9.9 g of 4,4'-diaminodiphenylmethane and 50 g of phenol were placed in a vessel and heated for 1 hour with the temperature of the bath maintained at 200° C. The by-product water was removed by azeotropic distillation with xylene. Then, 47.7 g of diphenyl terephthalate, 9.3 g of ethylene glycol, 1.0 g of glycerine and 0.2 g of zinc acetate were added, and the mixture was heated for 1.5 hours with the temperature of the bath maintained at 200° C. After the reaction, 90 g of cresol was added to the reaction mixture. A part of the solution was taken, and the product was separated. The product was found to have an inherent viscosity in m-cresol, of 0.24. As a result of the terminal group analysis, the proportion of the terminal phenyl ester groups based on the entire end groups was 84 mole%.

EXAMPLE 1

220 g of tris(β-hydroxyethyl)isocyanurate was added to the cresol solution of the low-molecular-weight polyester obtained in Referential Example 1, and they were reacted for 1.5 hours at a bath temperature of 200° C. After the reaction, 20 g of tetrabutyl titanate and 200 g of xylene were added to form a wire-enamelling varnish. The varnish was dried at 200° C. for 2 hours, and the involatile content was measured from the residue, and found to be 42.5% by weight. The varnish had a solution viscosity measured at 30° C. of 18 poises.

The varnish was coated on a glass plate, and baked at 250° C. for 5 minutes to afford a transparent tough film.

The varnish was coated on a 0.3 mm thick copper plate, pre-dried at 150° C. for 1 hour, and baked at 275° C. for a predetermined period of time. The properties of the resulting coating are shown in Table 1.

The varnish was coated on a mild copper wire with a conductor diameter of 1.0 mm, and baked in a small-sized test oven to afford an insulated wire. The properties of the insulated wire obtained were measured in accordance with JIS C-3210 (polyester-insulated copper wires). The results are shown in Table 2.

COMPARATIVE EXAMPLE 1

20 g of tetrabutyl titanate and 250 g of xylene were added to the solution prepared in Referential Example 16 to afford a wire-enamelling varnish. The varnish was coated on a mild copper wire with a conductor diameter of 1.0 mm, and baked in a small-sized test oven to afford an insulated electric wire. The properties of the resulting insulated wire are shown in Table 2.

COMPARATIVE EXAMPLE 2

50 g of the depolymerized polyester obtained in Referential Example 4, 21 g of tris-(β-hydroxyethyl)-isocyanurate, 150 g of cresol and 4 g of tetrabutyl titanate were heated for 1 hour at a bath temperature of 180° C. The reaction mixture was uniform while hot, but when cooled to room temperature, the solid part precipitated.

The product while hot was coated on a glass plate, and baked at 250° C. for 10 minutes. The film obtained was non-transparent and brittle.

TABLE 1

| | Curability and flexibility test | | | | |
| --- | --- | --- | --- | --- | --- |
| | Time for baking at 275° C. (minutes) | | | | |
| | 1 | 2 | 3 | 4 | 5 |
| Example 1 | 4 | 1 | 1 | 1 | 1 |
| Comparative Example 1 | 4 | 3–4 | 2 | 1 | 1 |

Evaluation scale of the properties:
4: The film broke upon mere bending
3: When the film was bended strongly by means of pinchers, the bended portion broke
2: When the film was bended strongly by means of pinchers and the bended portion was rubbed with a finger nail, the film broke
1: Even when the film was bended strongly by means of pinchers and the bended portion was rubbed with a finger nail, the film did not break It can be seen from the results obtained that the curing properties are better in Example 1 than in Comparative Example 1.

In Example 1 at Table 2, no great difference in properties was seen even when the wire speed was varied. However, in Comparative Example 1, the properties were degraded greatly when the wire speed was higher.

It can be seen from Table 2 that the varnish obtained in Example 1 generally have superior properties to the varnish in Comparative Example 1, and especially superior curing properties.

TABLE 2

|  | Example 1 |  | Comparative Example 1 |  |
|---|---|---|---|---|
| Baking conditions |  |  |  |  |
| Conductor diameter (mm) | 1.0 | 1.0 | 1.0 | 1.0 |
| Baking temperature (°C.) | 400 | 400 | 400 | 400 |
| Wire speed (meters/min.) | 5 | 12 | 5 | 12 |
| Film thickness (mm) | 0.040 | 0.041 | 0.039 | 0.041 |
| Properties |  |  |  |  |
| Pin Hole Test (Pin holes per meter length) |  |  |  |  |
| untreated | 0 | 0 | 0 | 0 |
| 10% streached | 0 | 0 | 0 | many |
| Flexibilty (1 × d) | good | good | good | poor |
| Abrasion resistance (0.7 kg) (strokes) | 53 | 58 | 47 | — |
| Cut-Through temperature (°C.) | 290 | 283 | 272 | — |
| Dielectric breakdown voltage (KV/mm) | 112 | 114 | 107 | — |
| Thermal shock resistance (200° C. × 1 hr) | 2d | 2d | 3d | — |

EXAMPLE 2

20 g of the low-molecular-weight polyester obtained in Referential Example 2, 5.2 g of polymethylene-polyphenylene-polyamine (containing 2.5 amino groups per molecule), 0.2 g of tetrabutyl titanate, and 40 g of cresol were mixed and heated at 200° C. for 1 hour.

A part of the reaction solution was taken, and poured into a large amount of methanol. The resulting precipitate was filtered, and dried. The product had an inherent viscosity, in m-cresol, of 0.48.

The solution was coated on a glass sheet, pre-dried at 150° C. for 20 minutes, and baked at 250° C. for 10 minutes. There can be obtained a self-supporting film having dood elongation.

COMPARATIVE EXAMPLE 3

To 20 g of the low-molecular weight polyester obtained in Referential Example 18 were added 2.5 g of polymethylene-polyphenylene-polyamine, 0.2 g of tetrabutyl titanate and 30 g of cresol, and the mixture was heated at 200° C. for 1 hour. The resulting solution was coated on a glass sheet, predried at 150° C. for 20 minutes, and then baked at 250° C. for 10 minutes. A flaky coating was obtained, but a self-supporting flexible film could not be formed.

This shows that the terminal aryl ester groups have high reactivity with amino groups.

EXAMPLE 3

A 5-liter three-necked flask was charged with 267.3 g (1.35 moles) of 4,4'-diaminodiphenylmethane and 700 g of cresol, and the mixture was heated at 100° C. to dissolve the 4,4'-diaminodiphenylmethane in cresol. Then, 288 g (1.5 moles) of trimellitic anhydride was gradually added to the solution with stirring. The whole reaction mixture became a yellow slurry. Then, 200 g of xylene was added to the slurry and heated at 170° to 200° C. The by-product water was removed by azeotropic distillation with xylene, and 321 g (1.5 moles) of diphenyl carbonate and 2 g of tetrabutyl titanate were added to the reaction mixture. Then, the bath temperature was elevated to 240° to 260° C. and a mixture of cresol and phenol formed as a by-product was removed gradually by distillation. After 700 g of the above mixture had been distilled, the condensation reaction was continued under reflux for about 5 hours with stirring.

The temperature inside the flask was about 220° C., and a viscous slightly turbid liquid was obtained. When 840 g of cresol was thrown into the viscous liquid, a homogeneous solution of a polyamideimide precursor was obtained.

A small quantity of the solution was taken, and poured into methanol to separate the precursor. The product was examined for its inherent viscosity, infrared absorption spectrum and terminal group concentrations. As a result, it was found that the precursor had an inherent viscosity, as measured in N-methyl pyrrolidone, of 0.16. In the infrared absorption spectroscopy, the precursor was compared with an amideimide oligomer having a known structure synthesized from trimellitic anhydride and 4,4'-diaminodiphenylmethane in N-methyl pyrrolidone. The two oligomers exhibited well-coinciding absorptions at 400 cm$^{-1}$ to 1,300 cm$^{-1}$, and it was therefore confirmed that both polymers showed specific absorptions characteristic of amide and imide groups. However, as regards the range of from 1300 cm$^{-1}$ to 650 cm$^{-1}$, the precursor exhibited peaks at 750 cm$^{-1}$, 1000 cm$^{-1}$ and 1280 cm$^{-1}$, none of which was observed in the spectrum of the comparative oligomer. Since it was presumed that these absorptions might be due to terminal aryl ester groups, a model polyamideimide having terminal phenyl groups synthesized by reacting 4-phenyl trimellitate 1,2-anhydride with 4,4'-diaminodiphenylmethane in N-methyl pyrrolidone was analyzed by infrared absorption spectroscopy. As a result, absorption peaks were observed similarly at 750 cm$^{-1}$, 1000 cm$^{-1}$ and 1280 cm$^{-1}$. It was concluded therefore that these absorptions were attributable to the terminal aryl ester groups. From the foregoing, it was confirmed that the polyamideimide precursor obtained in this Example had terminal aryl ester groups.

The terminal groups were analyzed in the following manner.

The precursor sample was dissolved in cresol and titrated with hydrochloric acid. As a result, the amount of terminal amino groups was found to be $0.7 \times 10^{-4}$ mole/g. The terminal phenylurethane groups were determined by dissolving the sample precursor in N-methyl pyrrolidone, adding thereto di-n-butylamine, reacting them for 1 hour at 100° C. and titrating the reaction product to know the weight decrease of di-n-butylamine. As a result, it was found that the amount of terminal phenylurethane groups was $0.6 \times 10^{-4}$ mole/g. By titration, the amount of the terminal carboxyl groups was found to be $0.3 \times 10^{-4}$ mole/g.

It is understood that amino groups react with carboxyl groups or acid anhydride groups in a molar ratio of 1:1 to form amide and imide groups. Further, in the case of this Example, the terminal groups are considered to be limited to amino, urethane, carboxyl and aryl ester groups. Accordingly, the difference between the sum of terminal amino and urethane groups and the sum of terminal carboxyl and aryl ester groups is considered to coincide with the difference between the equivalent of the polycarboxylic acid component charged and the equivalent of the polyamine component charged. Since there is no simple method for determining aryl ester groups, the amount of the terminal aryl ester groups was calculated by utilizing the above-mentioned relations, and found to be $8.2 \times 10^{-4}$ mole/g. It was confirmed therefore that the terminal aryl ester groups account for about 84 mole% of the entire terminal groups.

To the resulting solution were added 250 g of the low-molecular weight polyester obtained in Referential Example 2, 180 g of tris-(β-hydroxyethyl)isocyanurate, 10 g of tetrabutyl titanate and 228 g of cresol. The mixture was heated for 1 hour at 200° C. After the reaction, the reaction mixture was diluted with 450 g of xylene, and 20 g of tetrabutyl titanate was further added to form a varnish. The varnish had a solid content of 34.9% by weight and a viscosity of 49 poises at 30° C.

The resulting varnish was coated on a mild copper wire with a conductor diameter of 1.0 mm, and repeated coated and baked 7 or 8 times in an oven at 350° to 450° C. at a wire speed of 8 meter/min. The properties of the resulting insulated wire were measured, and the results are shown in Table 3.

COMPARATIVE EXAMPLE 4

A polyamideimide precursor was obtained in the same way as in Example 3. To the resulting precursor solution, 78.3 g of tris-(β-hydroxyethyl)isocyanurate and 5.10 g of tetrabutyl titanate were added. The mixture was heated for 1 hour at 200° C. After the reaction, 315 g of xylene and 10 g of tetrabutyl titanate were added to afford a varnish which had a solids content of 30.4% by weight and a viscosity of 40 poises at 30° C.

The varnish was coated and baked on a mild copper wire with a conductor diameter of 1.0 mm in the same way as in Example 3 to form an insulated wire. The properties of the insulated wire are shown in Table 3.

TABLE 3

General Properties of Enamelled Wires

|  | Example 3 | Comparative Example 4 |
|---|---|---|
| Wire Size |  |  |
| bare wire diameter (mm) | 1.001 | 1.000 |
| finish wire diameter (mm) | 1.079 | 1.081 |
| Appearance | good | good |
| Pin-hole Test (number/50m) |  |  |
| untreated | 0/50 | 0/50 |
| 10% stretched | 0/50 | 4/50 |
| Abrasion Resistance |  |  |
| repeated scrape test (700 g load, strokes) | 128 | 131 |
| Twisting Resistance (times) | 83 | 48 |
| Cut-Through Temperature (°C.) |  |  |
| (weight 2.5 kg) | 374 | 387 |
| Thermal Shock Resistance (number/30m) |  |  |
| (300° C. 1 hr.) | 0/30 | 0/30 |
| Break Down Voltage |  |  |
| (twisted pair method) |  |  |
| untreated (KV/0.1 mm) | 17.1 | 18.9 |
| after aging at 260° C. for 7 days | 12.4 | 14.0 |
| Chemical Resistance |  |  |
| dipped in 10% aq. NaOH at room temperature for 24 hours | good | good |

It can be seen from the results obtained that the varnish prepared in Example 3 showed markedly improved mechanical properties such as abrasion resistance and twisting resistance over the varnish prepared in Comparative Example 4 without an appreciable deterioration in thermal properties, as a result of adding the oligomeric polyester containing terminal aryl ester groups.

EXAMPLE 4

25.8 g of benzophenonetetracarboxylic dianhydride, 10.7 g of 4-phenyl trimellitate-1,2-anhydride, 12.2 g of toluylene diamine and 180 g of cresol were mixed, and heated for 2 hours in a stream of nitrogen with stirring at a bath temperature of 180° to 200° C. The by-product water was removed by azeotropic distillation with xylene.

After the reaction, a part of the reaction mixture was taken, and poured into a large amount of methanol to separate the reaction product. The reaction product was found to have an inherent viscosity, as measured in N-methylpyrrolidone, of 0.27. The product was an imide oligomer containing terminal phenyl carboxylate groups.

To the resulting solution were added 30 g of the low-molecular-weight polyester obtained in Referential Example 2, 16.0 g of tris-(β-hydroxyethyl)isocyanurate and 0.5 g of tetrabutyl titanate. The mixture was heated for 1 hour at 180° C.

The resulting solution was coated on a copper plate, pre-dried, and baked at 300° C. for 3 minutes to afford a coating having a surface luster. The copper plate was then bended, and the bended portion was pressed strongly by means of pinchers and rubbed with a finger nail. No crack occurred in the film.

For comparison, a solution of similar properties was prepared in the a same way as above except that the oligomeric ester was not added, and the solution was baked on a copper plate under the same conditions as above. When the baked film was bended, strongly pressed by means of pinchers, and rubbed with a fingernail, cracks occurred here and there at the bended portions.

EXAMPLE 5

A mixture of 536 g of 4-phenyl trimellitate 1,2-anhydride, 277 g of 4,4'-diaminodiphenylmethane and 46.4 g of hexamethylenediamine was heated under reflux for 3 hours at a bath temperature of 250° C. in 1200 g of cresol, while gradually distilling off water and cresol. After the reaction, 900 g of cresol was freshly added. After the reaction, a part of the reaction solution was taken, and added to methanol to isolate the product. The product was found to have an inherent viscosity, in N-methyl pyrrolidone, of 0.24, and the concentration of the terminal amino groups was determined to be $1.9 \times 10^{-4}$ mole/g. The concentration of the terminal aryl ester groups was calculated from this, and found to be $7.8 \times 10^{-4}$ mole/g. The proportion of the terminal aryl ester groups based on the entire terminal groups was 80 mole%. The above solution had a solids content of 41.7% by weight.

500 g of this solution was then mixed with 50 g of the low-molecular-weight polyester obtained in Referential Example 3, 37 g of tris-(β-hydroxyethyl)isocyanurate, 3 g of tetrabutyl titanate and 170 g of cresol, and the mixture was heated at a bath temperature of 180° C. for 30 minutes.

After the reaction, 200 g of mixed xylene and 5 g of tetrabutyl titanate were added to the reaction mixture to form a wire-enamelling varnish.

The varnish was coated on a 0.3 mm thick copper plate, pre-dried at 150° C. for 1 hour, and then baked at 300° C. for a predetermined period of time. The properties of the varnish were determined, and the results are shown in Tables 4 and 5.

The heat softening temperature was measured as follows:

An end-pointed electrode was placed on a coated copper plate and put in a constant temperature tank after excerting a load thereon. A potential of 100 V was applied to the electrode, and the temperature was elevated. The temperature at which short-circuiting occurred was measured, and made the heat softening temperature.

COMPARATIVE EXAMPLE 5

To 500 g of the solution obtained in Example 5 were added 27 g of tris-($\beta$-hydroxyethyl)isocyanurate and 1 g of tetrabutyl titanate. The mixture was heated at a bath temperature of 180° C. for 30 minutes. After the reaction, 70 g of cresol, 150 g of mixed xylene and 5 g of tetrabutyl titanate were added to form a varnish.

COMPARATIVE EXAMPLE 6

45.0 g of dimethyl terephthalate, 11.5 g of ethylene glycol, 36.8 g of tris-($\beta$-hydroxyethyl)isocyanurate and 20 cc of xylene were placed in a vessel, and 1.0 g of lead acetate was added. The mixture was heated at a bath temperature of 110° to 240° C. for 10 hours in total in a stream of nitrogen. Then, 135 g of cresol was added to form a uniform solution. To this solution were added 500 g of the solution obtained in Example 5 and 2 g of tetrabutyl titanate. The mixture was heated for 30 minutes at a bath temperature of 180° C. After the reaction, 240 g of mixed xylene and 5 g of tetrabutyl titanate were added to afford a varnish.

TABLE 4

| | Curability and flexibility | | | | |
|---|---|---|---|---|---|
| | Time for baking at 300° C. (minutes) | | | | |
| | 1 | 2 | 3 | 4 | 5 |
| Example 5 | 4 | 1 | 1 | 1 | 1 |
| Comparative Example 5 | 4 | 4 | 2 | 1-2 | 1-2 |
| Comparative Example 6 | 4 | 4 | 1-2 | 1 | 1 |

*The evaluation scale was the same as in Table 1.

TABLE 5

| Heat softening temperature (load = 800 g) | |
|---|---|
| | Heat-softening temperature (°C.) |
| Example 5 | 371 |
| Comparative Example 5 | 389 |
| Comparative Example 6 | 348 |

The curability and flexibility were the best in Example 5. In Comparative Example 6, the flexibility was good, but the heat softening temperature was low. Example 5 showed far better curability and flexibility than Comparative Example 5 although the heat softening temperature was not lowered so much.

EXAMPLE 6

333 g of N,N'-bis(ethoxycarbonylmethyl)-4,4'-diaminodiphenylmethane, 59.8 g of phenyl N-ethoxycarbonylmethyl-m-amino benzoate, 250 g of 4,4'-diphenylmethanediisocyanate, and 200 g of cresol were placed in a vessel, and the temperature of the bath was raised to 240° to 260° C. in a stream of nitrogen with stirring.

Cresol was distilled off gradually to concentrate the mixture to an extent that it did not solidify. The reaction was continued at the same bath temperature for 3 hours. After the reaction, 1000 g of cresol was added to form a reddish brown transparent solution. The product had an inherent viscosity, in m-cresol, of 0.27. The infrared absorption spectrum of the product showed characteristic hydantoin absorptions at 1780 and 1710 cm$^{-1}$. It was confirmed therefore that a hydantoin oligomer containing terminal phenyl carboxylate groups was obtained.

To the above solution were added 140 g of the low-molecular-weight polyester obtained in Referential Example 3, 63 g of tris-($\beta$-hydroxyethyl) isocyanurate and 5 g of tetrabutyl titanate, and the mixture was heated at a bath temperature of 180° C. for 1 hour.

The resulting solution was coated on a copper plate, pre-dried, and based at 300° C. for 3 minutes. There was obtained a coated film with a surface luster.

The coated copper plate was bended, and the bended portion was pressed strongly by means of pinchers. No crack was formed in the film at the bended portion.

EXAMPLE 7

333 g of N,N'-bis-(ethoxycarbonylmethyl)-4,4'-diaminodiphenylmethane, 198 g of 4,4'-diaminodiphenylmethane, 450 g of diphenyl carbonate, 4 g of tetrabutyl titanate and 200 g of cresol were placed in a vessel, and the temperature of the bath was raised to 240° to 260° C. in a stream of nitrogen with stirring. The cresol and phenol were distilled off gradually to concentrate the reaction mixture to an extent that it did not solidify. The mixture was reacted at the same bath temperature for an additional 6 hours. Then, 44.6 g of N-ethoxycarbonylmethyl-m-amino benzoic acid, and 50 g of diphenyl carbonate were added, and the mixture was heated under the same conditions for 4 hours. After the reaction, 1000 g of cresol was added to form a reddish brown transparent solution.

The product had an inherent viscosity, in m-cresol, of 0.22. The infrared absorption spectrum of the product was found to be the same as that of the hydantoin oligomer containing terminal phenyl carboxylate groups obtained in Example 6, showing characteristic hydantoin absorptions at 1780 and 1710 cm$^{-1}$ and characteristic phenyl carboxylate absorptions at 750 and 1080 cm$^{-1}$. The characteristic amide absorption in the vicinity of 1660 cm$^{-1}$ was observed only slightly.

The concentration of terminal carboxyl groups was found to be $0.2 \times 10^{-4}$ mole/g.

To the resulting solution were added 140 g of the low-molecular-weight polyester obtained in Referential Example 3, 63 g of tris-($\beta$-hydroxyethyl) isocyanurate and 5 g of tetrabutyl titanate, and the mixture was heated at a bath temperature of 180° C. for 1 hour. After the reaction, 10 g of tetrabutyl titanate and 350 g of mixed xylene were added to form a varnish.

COMPARATIVE EXAMPLE 7

A hydantoin oligomer containing terminal phenyl carboxylate groups was prepared in the same way as in Example 7. To a solution of this hydantoin oligomer were added the solution obtained in Referential Example 17, 53 g of tris-($\beta$-hydroxyethyl) isocyanurate and 1.0 g of tetrabutyl isocyanurate. The mixture was heated at a bath temperature of 180° C. for 1 hour. After the reaction, 14.0 g of tetrabutyl titanate and 200 g of mixed xylene were added to form a varnish.

Each of the varnishes obtained in Example 7 and Comparative Example 7 was coated on a 0.3 mm thick copper plate, pre-dried at 150° C. for 1 hour, and then baked at 300° C. for a predetermined period of time. The properties of the film were measured in the same way as in Example 5, and the results are shown in Tables 6 and 7.

TABLE 6

| | Curability and flexibility | | | | |
|---|---|---|---|---|---|
| | Time for baking at 300° C. (minutes) | | | | |
| | 1 | 2 | 3 | 4 | 5 |
| Example 7 | 4 | 1 | 1 | 1 | 1 |
| Comparative Example 7 | 4 | 4 | 2 | 1-2 | 1-2 |

*The evaluation scale was the same as in Table 1.

TABLE 7

| Heat softening temperature (load = 800 g) | |
|---|---|
| | Heat softening temperature (°C.) |
| Example 7 | 362 |
| Comparative Example 7 | 352 |

The film obtained in Example 7 showed superior thermal properties, flexibility and curability to the film obtained in Comparative Example 7.

EXAMPLE 8

32.2 g of benzophenonetetracarboxylic dianhydride, 20.3 g of 3,3'-dimethyl-4,4'-diaminodiphenylmethane, 2.4 g of 2-amino-2-methyl-1,3-propanediol and 100 g of cresol were placed in a vessel. The temperature of the bath was raised to 200° C. in a stream of nitrogen with stirring, and the reaction was performed for 2 hours. The by-product water was removed by azeotropic distillation with xylene. The product had an inherent viscosity, in m-cresol, of 0.27. There was obtained a polyamide containing terminal hydroxyl groups.

To the resulting solution were added the low-molecular-weight polyester solution obtained in Referential Example 5 and 64 g of tris-($\beta$-hydroxyethyl) isocyanurate. The mixture was heated at a bath temperature of 180° to 190° C. for 2 hours. After the reaction, 6 g of tetrabutyl titanate and 150 g of xylene were added to form a wire-enamelling varnish.

The varnish was coated on a copper wire with a conductor diameter of 1.0 mm, and baked. The properties of the enamelled wire were as follows:

| Baking temperature | 400° C. |
|---|---|
| Wire speed | 8 meters/min |
| Film thickness | 0.040 mm |
| Abrasion resistance (0.7 kg) | 72 strokes |
| Cut-through temperature | 362° C. |
| Thermal shock resistance (250° C. × 1 hr) | 1d OK |

EXAMPLE 9

To the solution obtained in Referential Example 8, 250 g of tris-($\beta$-hydroxyethyl) isocyanurate was added. The mixture was heated at a bath temperature of 200° C. for 1 hour. After the reaction, 25 g of tetrabutyl titanate was added, and then 250 g of xylene was added. There was obtained a wire-enamelling varnish.

Using the resulting varnish, an insulated wire was produced in the same way as in Example 1. The baking conditions and the results are shown in Table 8.

COMPARATIVE EXAMPLE 8

192 g of trimellitic acid, 99 g of 4,4'-diaminodiphenylmethane and 100 g of cresol were placed in a vessel, and the mixture was heated at a bath temperature of 180° to 200° C. for 2 hours. The by-product water was removed as the xylene azeotrope. Then, the temperature of the bath was lowered, and 291 g of dimethyl terephthalate, 112 g of ethylene glycol, 212 g of tris($\beta$-hydroxyethyl) isocyanurate and 0.5 g of lead acetate were added. The mixture was heated at a bath temperature of 110° to 160° C. for about 10 hours.

When the distillation of methanol almost ended, the temperature of the bath was raised to 200° to 240° C., and the mixture was heated to 200° to 240° C. for about 9 hours. Then, 900 g of cresol, 20 g of tetrabutyl titanate and 200 g of xylene were added to afford a wire-enamelling varnish.

Using the resulting varnish, an insulated wire was produced in the same way as in Example 1. The baking conditions and the results are shown in Table 8.

TABLE 8

| | Example 9 | | Comparative Example 8 | |
|---|---|---|---|---|
| Baking conditions | | | | |
| Conductor diameter (mm) | 1.0 | 1.0 | 1.0 | 1.0 |
| Baking temperature (°C.) | 400 | 400 | 400 | 400 |
| Wire speed (m/min.) | 5 | 12 | 5 | 12 |
| Film thickness (mm) | 0.039 | 0.038 | 0.040 | 0.040 |
| Properties | | | | |
| Pin Hole Test (pin holes per meter length) | | | | |
| untreated | 0 | 0 | 0 | 0 |
| 10% stretched | 0 | 0 | 0 | many |
| Flexibility (1 × d) | good | good | good | poor |
| Abrasion resistance (0.7 Kg) (strokes) | 68 | 69 | 51 | — |
| Cut-through temperature (°C.) | 344 | 341 | 327 | — |
| Dielectric breakdown voltage (KV/mm) | 128 | 121 | 128 | — |
| Thermal shock resistance (200° C. × 2 hrs.) | 1d | 1d | 2d | — |

The wire coating formed in Example 9 is generally superior in quality, especially thermal stability, and curability to that obtained in Comparative Example 8, and the efficiency of operation increases in Example 9.

EXAMPLE 10

A 5-liter reactor was charged with 303 g of trimellitic anhydride, 112 g of isophthalic acid and 330 g of cresol, and the temperature of the bath was raised to 110° C. With stirring, 507 g of 4,4'-diphenylmethane diisocyanate was added slowly. Then, the temperature of the bath was raised to 240° to 250° C., the mixture was heated at this temperature for 3 hours in a stream of nitrogen. Subsequently, 48 g of diphenyl carbonate and 3 g of tetrabutyl titanate were added, and the mixture was heated at the same bath temperature for 2 hours. After the reaction, 1194 g of cresol was added. A part of the reaction solution was taken, and added to methanol to isolate the reaction product.

The product had an inherent viscosity, in N-methyl pyrrolidone, of 0.27. The infrared absorption spectrum of the product showed characteristic phenyl carboxylate absorptions at 1290 and 920 cm$^{-1}$. As a result of the terminal group determination, it was found that the concentrations of the terminal amino groups, terminal urethane groups and terminal carboxyl groups were $0.6\times10^{-4}$ mole/g, $4.1\times10^{-4}$ mole/g, and $5.1\times10^{-4}$ mole/g, respectively. The concentration of the terminal aryl carboxylate groups, as calculated in accordance with the procedure shown in Example 3, was $5.2\times10^{-4}$ mole/g, and its proportion in the entire end groups was 35 mole%.

To the resulting solution were added 200 g of low-molecular-weight polyester containing terminal phenyl carboxylate groups obtained in Referential Example 2 and the mixture was heated at a bath temperature of 180° C. for 1 hour. After the reaction, 403 g of xylene and 22 g of tetrabutyl titanate were added to the reaction mixture to afford a wire-enamelling varnish. The varnish had a solids content of 35.2% by weight, and a viscosity at 30° C. of 58 poises.

The varnish was coated on a mild copper wire with a conductor diameter of 1 mm, and baked to form an insulated wire. The characteristics of the insulated wire are shown in Table 9.

EXAMPLE 11

A 10-liter reaction kettle was charged with 605 g of trimellitic anhydride, 224 g of isophthalic acid and 660 g of cresol, and the temperature of the bath was raised to 100° C. With stirring, 1013 g of 4,4'-diphenylmethane diisocyanate was added slowly. Then, the temperature of the bath was raised to 240° to 250° C., and the mixture was heated for 3 hours in a stream of nitrogen. Subsequently, 96 g of diphenyl carbonate and 6 g of tetrabutyl titanate were added, and the mixture was heated at the same bath temperature for 2 hours. To the resulting reaction mixture, 369 g of film-forming polyethylene terephthalate chips, 75 g of diphenyl carbonate and 6 g of tetrabutyl titanate were added. The mixture was heated at the same bath temperature for an additional 2 hours. After the reaction, 2389 g of cresol was added to form a reddish brown uniform solution.

A part of this solution was taken, and added to methanol to isolate the reaction product. The reaction product had an inherent viscosity, in N-methyl pyrrolidone, of 0.28. As a result of the terminal group determination, it was found that the concentrations of the terminal urethane groups, terminal amino groups and terminal carboxyl groups were $1.1\times10^{-4}$ mole/g, $0.3\times10^{-4}$ mole/g, and $1.2\times10^{-4}$ mole/g, respectively.

363 g of tris-($\beta$-hydroxyethyl) isocyanurate was added to the above solution, and the mixture was heated at a bath temperature of 180° C. for 1 hour. After the reaction, 805 g of xylene and 45 g of tetrabutyl titanate were added to form a wire-enamelling varnish. The varnish had a solids content of 35.1% by weight, and a viscosity at 30° C. of 64.5 poises.

The varnish was coated on a mild copper wire with a conductor diameter of 1 mm, and baked to form an insulated wire. The characteristics of the insulated wire are shown in Table 9.

The resulting enamelled wire had equivalent properties to the enamelled wire had equivalent properties to the enamelled wire obtained in Example 10. Accordingly, the procedure of Example 11 in which the polyethylene terephthalate was decomposed with diphenyl carbonate in a polymerization system is very advantageous.

When the varnish obtained in this example was stored in a sealed container at room temperature for 6 months from April to September, its viscosity increased to 71.4 poises, but its curability and other characteristics remained unchanged, thus showing high storage stability.

TABLE 9

| General Properties of Enamelled Wires | Example 10 | Example 11 |
|---|---|---|
| Wire Size | | |
| bare wire diameter (mm) | 1.001 | 0.998 |
| finish wire diameter (mm) | 1.081 | 1.080 |
| Appearance | good | good |
| Pin-hole Test (number/50m) | | |
| untreated | 0/50 | 0/50 |
| 10% stretched | 0/50 | 0/50 |
| Abrasion Resistance | | |
| repeated scrape test (700 g load, strokes) | 199 | 211 |
| Twisting resistance (times) | 94 | 90 |
| Cut-through temperature (°C.) (weight 2.5 Kg) | 373 | 383 |
| Thermal Shock Resistance (number/30m) | | |
| (260° C., 1 hr) | 0/30 | 0/30 |
| Break Down Voltage (twisted pair method) | | |
| untreated (KV/0.1 mm) | 18.2 | 18.0 |
| after aging at 260° C. for 7 days | 14.4 | 14.6 |
| Chemical Resistance | | |
| 10% aq NaOH at room temperature for 24 hours | good | good |

EXAMPLE 12

A 5-liter reactor was charged with 107.5 g of trimellitic acid, 39.8 g of isophthalic acid and 170 g of phenol, and the mixture was heated at a bath temperature of 195° to 220° C. for 2 hours. After the reaction, a very small portion of the reaction mixture was taken, and washed with a small amount of acetone to isolate the reaction product. The infrared absorption spectrum of this product showed characteristic absorptions attributable to 4-phenyl trimellitate 1,2-anhydride and phenyl isophthalate in addition to absorptions ascribable to trimellitic acid and isophthalic acid.

To the resulting solution, 107.5 g of trimellitic acid, 39.8 g of isophthalic acid and 100 cc of mixed xylene were added. Water present in the reaction system was removed as the xylene azeotrope. Subsequently, 360 g of 4,4'-diphenylmethane diisocyanate was added, and the mixture was heated at 230° to 240° C. for 3 hours. Then, 132 g of film-forming polyethylene terephthalate chips, 26.7 g of diphenyl carbonate, 2 g of tetrabutyl titanate and 120 g of cresol were added, and the mixture was heated at the same bath temperature for 2 hours. After the reaction, 679 g of cresol was added to form a reddish brown uniform solution.

A part of the solution was taken out, and added to methanol to isolate the reaction product.

The reaction product had an inherent viscosity, in N-methyl pyrrolidone, of 0.24. As a result of the terminal group determination, it was found that the concentrations of the terminal urethane groups, terminal amino groups and terminal carboxyl groups were $0.9\times10^{-4}$ mole/g, $0.3\times10^{-4}$ mole/g, and $1.5\times10^{-4}$ mole/g, respectively. The infrared absorption spectrum of the product showed absorptions at 750, 1080 and 1290 cm⁻¹ attributable to the terminal aryl carboxylate groups.

To the resulting solution, 129.1 g of tris-(β-hydroxyethyl) isocyanurate and 2 g of tetrbutyl titanate were added, and the mixture was heated at a bath temperature of 180° C. for 1 hour. After the reaction, 424 g of xylene and 19 g of tetrabutyl titanate were added to form a wire-enamelling varnish.

The resulting varnish was coated on a copper wire with a conductor diameter of 1.0 mm, and baked. The characteristics of the enamelled wire and the baking conditions were as follows:

| | |
|---|---|
| Baking temperature | 450° C. |
| Wire speed | 8 meters/min. |
| Film thickness | 0.042 mm |
| Abrasion resistance (0.7 Kg) | 192 strokes |
| Cut-Through temperature | 379° C. |
| Thermal shock resistance (300° × 1 hr) | Id OK |

EXAMPLE 13

A 10-liter reaction kettle was charged with 576 g of trimellitic acid, 475 g of 4,4'-diaminodiphenylmethane, 36.6 g of toluylenediamine and 1000 g of cresol, and the temperature of the bath was elevated to 140° to 200° C. The by-product water was removed as the xylene azeotrope. Then, 642 g of diphenyl carbonate and 10 g of tetrabutyl titanate were added, and the temperature of the bath was raised to 240° to 260° C. The reaction mixture was concentrated until its solids content became 70% by weight. After the concentration, the reaction was continued for 3 hours at a bath temperature of 250° C. Subsequently, 500 g of film-forming polyethylene terephthalate and 201 g of diphenyl carbonate were added, and the mixture heated at a bath temperature of 240° C. for 2 hours. After the reaction, 1500 g of cresol was added to form a reddish brown uniform solution. A part of the solution was taken, and added to methanol to isolate the reaction product.

The reaction product had an inherent viscosity, in N-methyl pyrrolidone, of 0.16. As a result of the terminal group determination, it was found that the concentrations of the terminal urethane groups, terminal amino groups, and terminal carboxyl groups were $0.4 \times 10^{-4}$ mole/g, $0.5 \times 10^{-4}$ mole/g, and $0.4 \times 10^{-4}$ mole/g, respectively. The infrared absorption spectrum of this product showed absorptions at 750, 1080, and 1280 cm⁻¹ ascribable to the terminal aryl ester groups.

340 g of tris-(β-hydroxyethyl) isocyanurate was then added to the resulting solution, and the mixture was heated at a bath temperature of 180° C. for 1 hours. Then, 65 g of tetrabutyl titanate and 810 g of xylene were added to form a wire-enamelling varnish. The varnish had a solids content of 38.9% by weight, and a viscosity at 30° C. of 42 poises.

The varnish was coated on a mild copper wire and baked in the same way as in Example 3 to form an insulated wire. The baking conditions and the properties of the resulting insulated wire are shown as follows:

| | |
|---|---|
| Baking temperature | 450° C. |
| Wire speed | 8 meters/sec. |
| Film thickness | 0.042 mm |
| Abrasion resistance (0.7 Kg) | 194 strokes |
| Cut-Through temperature | 371° C. |
| Thermal shock resistance | 0/30 m |
| (300° × 1 hr.) | |

The insulated wire exhibited almost the same properties as the insulated wire obtained in Example 3.

EXAMPLE 14

192 g of trimellitic anhydride, 158.4 g of 4,4'-diaminodiphenylmethane, 11.6 g of hexamethylenediamine, 200 g of cresol and 50 cc of xylene were placed in a vessel, and the temperature of the bath was gradually raised to 200° C. in a stream of nitrogen to distill off xylene. At this time, the by-product water was removed as the xylene azeotrope.

When 50 cc of xylene distilled out, 214 g of diphenyl carbonate and 3.0 g of tetrabutyl titanate were added. The temperature of the bath was raised to 230° to 250° C. to distill off cresol and phenol and to concentrate the reaction mixture. When 241 g of cresol and phenol distilled out, the operation was switched over to refluxing and the reaction was performed at the same temperature for 3 hours.

Then, 172 g of polyethylene terephthalate chips and 30 g of diphenyl carbonate were added, and the mixture was heated at a bath temperature of 230° C. for 1 hour. Within 10 minutes after the initiation of the reaction, the polyethylene terephthalate dissolved to form a reddish brown uniform solution. The reaction proceeded in this state. After the reaction, 690 g of cresol was added. A part of the solution was taken out, and the solid matter was separated. The solid matter obtained had an inherent viscosity, measured in N-methylpyrrolidone, of 0.23.

As a result of the terminal group determination, the concentrations of the terminal urethane groups, terminal amino groups and terminal carboxyl groups were $0.3 \times 10^{-4}$ mole/g, $0.2 \times 10^{-4}$ mole/g and $0.6 \times 10^{-4}$ mole/g, respectively.

To the resulting solution, 92.2 g of tris-(β-hydroxyethyl) isocyanurate was added. The temperature of the bath was maintained at 200° C., and the mixture was reacted for 1 hour. After the reaction, the reaction mixture was diluted with 210 g of xylene. 15 g of tetrabutyl titanate was further added to form a varnish. The varnish had a solids content of 38.5% by weight, and a viscosity at 30° C. of 53 poises.

The varnish was coated on a copper plate, pre-dried, and baked at 300° C. for 5 minutes. A film having a lusterous surface was obtained.

Even when this coated copper plate was bended strongly, no crack occurred at the bended portion.

COMPARATIVE EXAMPLE 9

The same reaction as in Example 14 was performed except that diphenyl carbonate was not used. When the polyethylene terephthalate was added, its mass remained in the reaction system and it took more than 3 hours to dissolve it uniformly. When the reaction mixture became uniform, the reaction was further performed for 1 hour, and then the reaction mixture was diluted with cresol. The solid matter was separated from this solution. Its inherent viscosity was determined to be 0.27. The concentration of the terminal carboxyl groups was $8.4 \times 10^{-4}$ mole/g.

Tris-(β-hydroxyethyl) isocyanurate was added to the solution to form a varnish similar to that obtained when diphenyl carbonate was added to it. When this varnish was coated on a copper plate and baked in the same manner, and the coated copper plate was bended, cracks occurred easily at the bended portion.

EXAMPLE 15

28.0 g of N,N'-bis(ethoxycarbonylmethyl)-m-diamino benzene, 16.0 g of 4,4'-diaminodiphenyl ether, 5.5 g of m-aminobenzoic acid, 100 g of film-forming polyethylene terephthalate, 59 g of diphenyl carbonate, and 2.0 g of tetrabutyl titanate were placed in a vessel, and the mixture was heated at a bath temperature of 240° to 260° C. in a stream of nitrogen with stirring. The reaction mixture was non-uniform in the early stage, but became liquid in 2 hours. The by-product phenol, ethylene carbonate and ethanol were distilled off as much as possible, and in this state, the reaction was continued for 6 hours. Then, 170 g of cresol was added to the reaction mixture to form a reddish brown uniform solution. The reaction product had an inherent viscosity in m-cresol of 0.13, and as a result of the terminal group determination, it was found that the concentrations of the terminal amino groups, terminal urethane groups and terminal carboxyl groups were $0.7 \times 10^{-4}$ mole/g, $0.6 \times 10^{-4}$ mole/g, and $0.9 \times 10^{-4}$ mole/g, respectively.

The infrared absorption spectrum of the product showed as hydantoin absorption at 1780 cm$^{-1}$, and absorptions at 750, 910 and 1290 cm$^{-1}$ attributable to the terminal aryl ester groups. A slight amido absorption was also found at 1660 cm$^{-1}$.

To the resulting solution was added 36 g of tris($\beta$-hydroxyethyl) isocyanurate, and the mixture was heated at a bath temperature of 180° C. for 1 hour. After the reaction, 70 g of xylene and 3 g of tetrabutyl titanate were added to form a wire-enamelling varnish. The varnish had a solids content of 39.8% by weight and a viscosity at 30° C. of 48 poises.

The varnish was coated on a mild copper wire with a conductor diameter of 1.0 mm, and baked. The baking conditions and the properties of the resulting insulated wire were as follows:

| | |
|---|---|
| Baking temperature | 430° C. |
| Wire speed | 8 meters/min. |
| Film thickness | 0.040 mm |
| Pin holes (10% stretched) | 0 |
| Flexibility | Id × OK |
| Abrasion resistance (0.7 Kg) | 124 strokes |
| Cut-Through temperature | 340° C. |

EXAMPLE 16

192 g of trimellitic anhydride, 213 g of 4,4'-diphenylmethane diisocyanate and 400 g of N-methylpyrrolidone were placed in a vessel, and the temperature of the bath was raised to 170° to 180° C. in a stream of nitrogen. The mixture was heated at this temperature for 2 hours.

The reaction product had an inherent viscosity, in N-methylpyrrolidone, of 0.28. The concentration of the terminal carboxyl groups was $9.3 \times 10^{-4}$ mole/g.

100 g of polyethylene-2,6-naphthalenedicarboxylate chips, 50 g of diphenyl carbonate and 1 g of dibutyltin diphthalate were added, and the mixture was reacted at a bath temperature of 240° to 260° C. The N-methylpyrrolidone was distilled off as much as possible. After reacting for 4 hours, 1000 g of cresol was added to form a reddish brown uniform solution. A part of the solution was taken out, and the solid was separated. The inherent viscosity of the solid separated was 0.31. The infrared absorption spectrum of the solid product showed absorptions at 750, 1000 and 1280 cm$^{-1}$ ascribable to the terminal aryl ester groups. The concentration of the terminal carboxyl groups decreased to $1.4 \times 10^{-4}$ mole/g. This shows that the diphenyl carbonate not only served to decompose the polyester, but also participated in the conversion of the terminal carboxyl groups of the amideimide polymer to their aryl ester groups.

62 g of tris-($\beta$-hydroxyethyl) isocyanurate and 4 g of tetrabutyl titanate were added to the resulting solution, and the mixture was heated at a bath temperature of 180° C. for 1 hour. The resulting solution was coated on a copper plate, predried, and baked at 300° C. for 3 minutes. A film with a lusterous surface was obtained. When the coated copper plate was bended strongly and the bended part was rubbed, no crack occurred in the bended part.

EXAMPLE 17

30.2 g of dicarboxylic acid containing a hydantoin ring expressed by the following formula

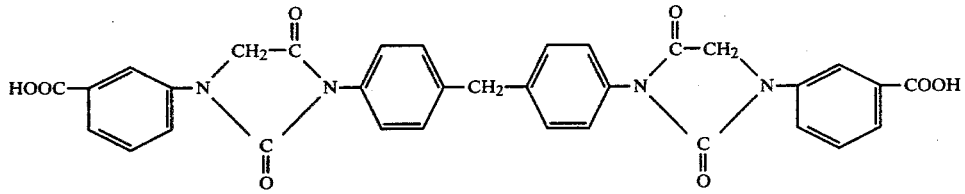

8.3 g of isophthalic acid, 12.4 g of 4,4'-diaminodiphenylmethane, 2.9 g of meta-phenylenediamine, 50 g of polyethylene terephthalate scrap (with an intrinsic viscosity of 0.81) formed in the manufacture of fiber-forming polyethylene terephthalate, 51 g of diphenyl carbonate, 1.0 g of tetrabutyl titanate and 20 g of cresol were placed in a vessel, and the mixture was heated at a bath temperature of 230° to 260° C. in a stream of nitrogen for 6 hours in total while concentrating the mixture gradually. After the reaction, 150 g of cresol was added to form a uniform solution.

A part of the solution was taken out, and added to methanol to isolate the reaction product. The product had an inherent viscosity, in m-cresol, of 0.18. The infrared absorption spectrum of the product showed characteristic absorptions at 750, 1080 and 1190 cm$^{-1}$ ascribable to the terminal aryl ester groups. As a result of the terminal groups determination, it was found that the concentrations of the terminal amino groups, terminal urethane groups, and terminal carboxyl groups were $0.3 \times 10^{-4}$ mole/g, $1.1 \times 10^{-4}$ mole/g and $1.9 \times 10^{-4}$ mole/g, respectively.

To the resulting solution were added 6.8 g of pentaerythritol, 3.1 g of ethylene glycol and 2.0 g of tetrabutyl titanate, and the mixture was heated at a bath temperature of 180° C. for 1 hour. After the reaction, the reaction mixture was diluted with 20 g of cresol, and 70 g of xylene. The resulting solution was coated on a copper plate, pre-dried, and baked at 250° C. for 20 minutes to afford a film with a lusterous surface. When the coated copper plate was bended strongly and the bended part was rubbed, no crack occurred.

EXAMPLE 18

32.2 g of benzophenonetetracarboxylic anhydride, 2.4 g of toluylenediamine, 11.3 g of 3,3'-dimethyl-4,4'-diaminodiphenylmethane, 8.2 g of m-aminobenzoic acid and 50 g of cresol were placed in a vessel, and the mixture was heated at a bath temperature of 180° C. for 2 hours. The by-product water was removed as the xylene azeotrope. Then, 100 g of polyethylene-(terephthalateisophthalate) copolymer chips (terephthalate unit:isophthalate unit=80:20), 44 g of dicresyl carbonate and 2 g of tetrabutyl titanate were added, and the mixture was heated at a bath temperature of 230° and 240° C. for 4 hours. After the reaction, 280 g of cresol was added. A part of the reaction solution was taken out, and added to methanol to isolate the reaction product. The product had an inherent viscosity, in m-cresol, of 0.19. As a result of the terminal group determination, it was found that the concentrations of the terminal carboxyl groups was $2.1 \times 10^{-4}$ mole/g.

To the resulting solution were added 49 g of tris($\beta$-hydroxyethyl) isocyanurate, 5 g of tetrabutyl titanate and 140 g of solvent naphtha. The resulting solution was impregnated in a thin glass cloth, and dried at 150° C. for 2 hours to form a prepreg. Five such prepregs were superimposed and the assembly was heated at a pressure of 200 Kg/cm$^2$ to 200° C. for 30 minutes and then at 250° C. for 20 minutes to form a tough laminated sheet.

EXAMPLE 19

57.6 g of trimellitic anhydride, 47.5 g of 4,4'-diaminodiphenylmethane, 3.7 g of toluylenediamine and 100 g of cresol were placed in a vessel. The temperature of the bath was elevated to 180° C., and the by-product water was removed as the xylene azeotrope. Then, 50 g of polytetramethylene terephthalate chips, 50 g of diphenyl carbonate and 1.0 g of tetrabutyl titanate were added, and the mixture was heated at a bath temperature of 240° to 260° C. The cresol and the by-product phenol were distilled off gradually to concentrate the reaction mixture to such an extent that it did not solidify. The reaction was performed for 5 hours in total. After the reaction, 200 g of cresol was added to form a uniform reddish brown solution.

A part of the solution was taken out to isolate the product. The inherent viscosity in N-methylpyrrolidone of the product was found to be 0.18. As a result of the terminal group determination, it was found that the concentrations of the terminal urethane groups, terminal amino groups and terminal carboxyl groups were $0.8 \times 10^{-4}$ mole/g, $0.7 \times 10^{-4}$ mole/g, and $1.1 \times 10^{-4}$ mole/g, respectively. The infrared absorptions spectrum of the product was the same as that of the reaction product obtained in Example 13.

Then, 34 g of tris-($\beta$-hydroxyethyl) isocyanurate was added to the resulting solution, and the mixture was heated at a bath temperature of 180° C. for 1 hour. Then, 6 g of tetrabutyl titanate and 80 g of xylene were added to form a varnish. The varnish was coated on a mild copper wire with a conductor diameter of 1 mm, and baked to form an insulated wire. The insulated wire had an abrasion resistance of 162 strokes (0.7 Kg) and a cut-through temperature of 367° C.

EXAMPLE 20

15.4 g of trimellitic anhydride, 6.4 g of benzophenonetetracarboxylic dianhydride, 19.8 g of 4,4'-diaminodiphenylmethane and 50 g of N-methylpyrrolidone were placed in a vessel, and the mixture was heated at a bath temperature of 240° to 260° C. in a stream of nitrogen.

During the heating, N-methylpyrrolidone gradually distilled off, and at the final stage, the reaction was carried out while the solids concentration was about 75% by weight. In this manner, the reaction was continued for 2 hours, and 50 g of N-methylpyrrolidone was added to the resulting reaction mixture.

A part of the solution was taken out, and the product was isolated. The inherent viscosity of the product was found to be 0.27. The concentration of the terminal amino groups was $6.8 \times 10^{-4}$ mole/g.

Then, 7.2 g of 4-phenyl trimellitate 1,2-anhydride and 10 g of xylene were added, and the mixture was heated at a bath temperature of 180° to 200° C. for 2 hours. During the reaction, the by-product water was removed as the xylene azeotrope. To the resulting solution were added 10 g of the low-molecular-weight polyester obtained in Referential Example 3, 10.0 g of tris-($\beta$-hydroxyethyl) isocyanurate and 0.2 g of dibutyltin dilaurate, and the mixture was heated at a bath temperature of 180° C. for 1 hour. After the reaction, the reaction mixture was added to water to isolate the product which was then well dried. The resulting powdery polycondensate was packed in a cylinder and heated at 300° C. for 5 minutes at 200 Kg/cm$^2$, during which time the gas was once let out of the cylinder. There was obtained a dark-brown, tough molded structure of a cylindrical configuration.

EXAMPLE 21

A mixture of 8.64 g of trimellitic anhydride, 3.87 g of 4-phenoxycarbonyl-N(3-carboxyphenyl)-phthalimide and 25.0 g of N-methylpyrrolidone was heated, and then, a mixture of 6.25 g of 4,4'-diphenylmethane diisocyanate and 4.35 g of toluylene diisocyanate was added. The mixture was heated at 170° to 180° C. for 3 hours. After the reaction, a part of the reaction solution was taken out to isolate the product. The product was found to have an inherent viscosity, in N-methylpyrrolidone, of 0.21. As a result of the terminal group determination, the concentration of the terminal aryl ester groups was found to be 81 mole%.

15 g of the low-molecular-weight polyester obtained in Referential Example 6, 6.5 g of polymethylene-polyphenylenepolyamine (containing 2.5 amino groups on an average per molecule), 1.0 g of dibutyltin dilaurate and 60 g of N-methylpyrrolidone were added to the resulting solution. The mixture was heated at a bath temperature of 180° C. for 1 hour. After the reaction, the solution was coated on a glass sheet, predried at 150° C. for 1 hour, and baked at 300° C. for 3 minutes to form a film having good self-supporting properties.

EXAMPLE 22

17.3 g of trimellitic anhydride, 3.2 g of benzophenonetetracarboxylic dianhydride, 19.8 g of 4,4'-diaminodiphenylmethane and 20 g of N-methylpyrrolidone were heated at a bath temperature of 240° to 250° C. The reaction mixture was gradually concentrated, and at the final stage, the reaction was performed for 3 hours while the solids content of the reaction mixture was maintained at 72% by weight. After the reaction, 70 g of N-methylpyrrolidone was added to form a uniform solution.

A part of the solution was taken out, and added to water to isolate the reaction product. The inherent viscosity of the product in N-methylpyrrolidone was found to be 0.28. The concentration of the terminal amino groups was $5.8 \times 10^{-4}$ mole/g.

Then, 5.9 g of 4-phenyl trimellitate 1,2-anhydride and 10 g of xylene were added to the reaction solution, and the temperature of the bath was elevated to 180° to 190° C. The by-product water was removed as the xylene azeotrope. 2.7 g of 4,4'-diphenylmethane diisocyanate was added to the reaction solution, and the mixture was heated at 180° C. for 3 hours. After the reaction, a part of the solution was taken out, and added to water to isolate the reaction product. The inherent viscosity of the product, in N-methylpyrrolidone, was found to be 0.33. The infrared absorption spectrum of this product showed characteristic absorptions at 750, 1000 and 1280 cm$^{-1}$ ascribable to the 4-phenoxycarbonyl-phthalimide group. The concentration of the terminal carboxyl groups was $0.4 \times 10^{-4}$ mole/g, and the proportion of the terminal aryl ester groups based on the entire end groups was 88 mole%.

15 g of the low-molecular-weight polyester obtained in Referential Example 11, 5 g of tris-($\beta$-hydroxyethyl) isocyanurate and 0.3 g of tributyltin dilaurate were added to the resulting solution, and the mixture was heated at a bath temperature of 180° C. for 1 hour.

The resulting solution was coated on a glass sheet, predried at 150° C. for 30 minutes, and baked at 300° C. for 3 minutes. There was obtained a self-supporting tough film.

When the solution was coated on a copper plate and baked in the same way, the film obtained had a surface luster. When the coated copper plate was strongly bended, no crack was formed in the bended part.

EXAMPLE 23

18.1 g of a dicarboxylic acid containing a hydantoin ring expressed by the following formula

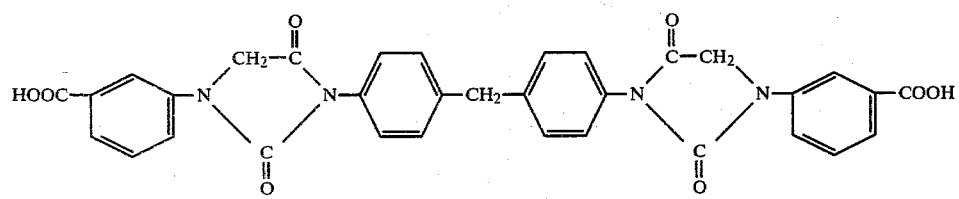

9.6 g of trimellitic anhydride, 10.7 g of 4-phenyl trimellitate 1,2-anhydride and 127 g of N-methylpyrrolidone were placed in a vessel, and 25.0 g of 4,4'-diphenylmethane diisocyanate was added. The mixture was heated at a bath temperature of 180° C. for 2 hours. After the reaction, a part of the solution was taken out, and the reaction product was isolated. The inherent viscosity of the product in N-methylpyrrolidone was found to be 0.25. As a result of the terminal group determination, the content of the terminal aryl ester groups was 79 mole%. Then, 25 g of the low-molecular-weight polyester obtained in Referential Example 9, 14 g of tris-($\beta$-hydroxyethyl) isocyanurate and 2 g of dibutyltin dilaurate were added to the resulting solution, and the mixture was heated at a bath temperature of 180° C. for 1 hour. After the reaction, 70 g of N-methylpyrrolidone, 84 g of solvent naphtha and 2 g of dibutyltin dilaurate were added to form a coating paint.

The resulting coating paint was coated on an aluminum plate having a thickness of 0.8 mm by means of a spray gun, and then pre-dried at 150° C. The coating and the drying were repeated to form a coating having a thickness of about 35 microns. Finally, the coating was baked at 300° C. for 3 minutes.

The properties of the resulting coated film are shown in Table 10, and prove very superior.

TABLE 10

| Item | Properties of coating Measurement result | Remarks |
|---|---|---|
| Adherence | 100/100 (no peeling) | cross cut adhesive cellophane tape peeling method |
| Flexibility | good (1 mm diameter) | mandrel test |
| Hardness | 5H | pencil hardness |
| Softening point | above 350° C. | tested according to JIS 3211 |
| Dielectric breakdown voltage | 17.4 KV/0.1 mm | |

EXAMPLE 24

26.8 g of 4-phenyl trimellitate 1,2-anhydride, 11.9 g of 4,4'-diaminodiphenylmethane, 2.6 g of tris-($\beta$-hydroxyethyl) isocyanate, 1.3 g of ethylene glycol, and 40 g of cresol were placed in a vessel, and the mixture was heated at a bath temperature of 220° C. for 6 hours. After the reaction, 50 g of cresol was added to form a red uniform solution.

A part of the solution was taken out, and the resulting product was isolated. The inherent viscosity of the reaction product was found to be 0.29. As a result of the terminal group determination, the content of the terminal aryl ester groups was 73 mole%.

The solution obtained was coated on a glass sheet, predried, and baked at 300° C. for 5 minutes. A self-supporting film could not be obtained.

Then, 40 g of the low-molecular-weight polyester solution obtained in Referential Example 7, 11 g of tris-($\beta$-hydroxyethyl) isocyanurate and 6 g of tetrabutyl titanate were added to this solution, and the mixture was heated at a bath temperature of 180° C. for 1 hour. After the reaction, 46 g of cresol and 50 g of xylene were added to the solution to form a varnish.

The varnish was impregnated in a 1.0 mm thick nonwoven cloth made of poly-m-phenylene isophthalamide fibers and pre-dried at 150° C. for 30 minutes. This operation was repeated three times, and finally, it was dried at 150° C. for 2 hours. The impregnated nonwoven cloth was heat-treated at 300° C. and 50 Kg/cm$^2$ for 5 minutes to form a brown tough sheet-like molded article.

EXAMPLE 25

16.1 g of benzophenonetetracarboxylic dianhydride, 7.9 g of 3,3'-dimethyl-4,4'-diaminodiphenylmethane, 6.4 g of phenyl m-aminobenzoate and 66 g of cresol were placed in a vessel, and the mixture was heated at a bath temperature of 180° to 200° C. for 2 hours. The by-product water was removed as the xylene azeotrope.

After the reaction, a part of the reaction solution was taken out, and added to methanol to isolate the reaction product. The inherent viscosity of the reaction product in N-methylpyrrolidone was found to be 0.23. As a result of the terminal group determination, the proportion of the terminal phenyl ester groups based on the entire end groups was 91 mole%.

50 g of the low-molecular-weight polyester obtained in Referential Example 14, 22 g of tris-($\beta$-hydroxyethyl) isocyanurate, 3 g of tetrabutyl titanate and 100 g of cresol were added to the resulting solution, and the mixture was heated at a bath temperature of 180° C. for 1 hour. After the reaction 70 g of xylene was added to form a varnish.

COMPARATIVE EXAMPLE 10

A cresol solution of low-molecular-weight polyimide containing terminal aryl ester groups was prepared by the same procedure as in Example 25. Then, 50 g of the low-molecular-weight polyester obtained in Referential Example 19, 22 g of tris($\beta$-hydroxyethyl) cyanurate, 3 g of tetrabutyl titanate and 100 g of cresol were added to this solution. The mixture was heated at a bath temperature of 180° C. for 1 hour. After the reaction, 70 g of xylene was added to form a varnish.

Each of the varnishes obtained in Example 25 and Comparative Example 10 was coated on a copper plate with a thickness of 0.3 mm, pre-dried at 150° C. for 1 hour, and baked at 300° C. for a predetermined period of time. The properties of the baked coatings were determined in the same way as in Example 5, and the results are shown in Tables 11 and 12.

TABLE 11

| | Curability and flexibility | | | | |
|---|---|---|---|---|---|
| | Time for baking at 300° C. (minutes) | | | | |
| | 1 | 2 | 3 | 4 | 5 |
| Example 25 | 4 | 1 | 1 | 1 | 1 |
| Comparative Example 10 | 4 | 3 | 2 | 1-2 | 1-2 |

*The evaluation scale was the same as in Table 1.

TABLE 12

| | Heat softening temperature (°C.) |
|---|---|
| Example 25 | 342 |
| Comparative Example 10 | 318 |

The film obtained in Example 25 showed superior thermal properties, flexibility and curability to the film obtained in Comparative Example 10.

EXAMPLE 26

25 g of the low-molecular-weight polyester obtained in Referential Example 9, 13.9 g of triphenyl trimesate, 18.3 g of tris-($\beta$-hydroxyethyl) isocyanurate 5.0 g of ethylene glycol, 1.0 g of zinc acetate and 120 g of cresol were placed in a vessel, and the mixture was heated at a bath temperature of 180° C. for 1.5 hours in a stream of nitrogen. After the reaction, 100 g of cresol was added to the reaction mixture to form a varnish. The resulting solution was coated on a glass sheet, pre-dried and baked at 250° C. for 5 minutes to form a self-supporting tough film.

When the solution was coated on a copper plate and baked at 250° C. for 4 minutes, there was obtained a coated film with a surface luster which did not develop any crack upon strong bending. The heat-softening temperature of the coating on the copper plate was 309° C.

EXAMPLE 27

26.8 g of 4-phenyl trimellitate 1,2-anhydride, 6.9 g of 4,4'-diaminodiphenylmethane, 1.6 g of meta-phenylene diamine, and 50 g of cresol were placed in a vessel, and the mixture was heated at a bath temperature of 180° C. for 2 hours. The by-product water was removed as the xylene azeotrope. Then, 50 g of the low-molecular-weight polyester obtained in Referential Example 6, 3.7 g of ethylene glycol, 2.3 g of propylene glycol, 8.3 g of glycerine, 1.0 g of tetrabutyl titanate and 100 g of cresol were added to the resulting mixture. The mixture was heated at a bath temperature of 180° C. for 1.5 hours to form a varnish.

The varnish was coated on a copper wire with a conductor diameter of 1.0 mm, and baked under the following conditions. The properties of the resulting enamelled wire were as follows:

| | |
|---|---|
| Baking temperature | 420° C. |
| Wire speed | 8 m/min. |
| Film thickness | 0.039 mm |
| Abrasion resistance (0.7 Kg) | 58 strokes |
| Heat softening temperature | 328° C. |
| Thermal shock resistance (220° C. × 1 hr.) | 1d OK |

EXAMPLE 28

47.7 g of diphenyl terephthalate, 111.3 g of diphenyl isophthalate, 69.6 g of hexamethylenediamine, 200 g of cresol and 1.0 g of tetrabutyl titanate were placed in a vessel, and the mixture was heated at a bath temperature of 200° to 220° C. for 2 hours.

After the reaction, a part of the reaction solution was taken out, and the product was isolated. The inherent viscosity of the product, measured in m-cresol, was 0.22.

To this solution were added the solution obtained in Referential Example 15, 25.9 g of polymethylene-polyphenylenepolyamine containing 2.5 amino group on an average per molecule and 7.0 g of tetrabutyl titanate. The mixture was heated at a bath temperature of 180° C. for 1 hour. After the reaction, 200 g of cresol was added. The resulting solution was coated on a glass plate, pre-dried at 140° C. for 1 hour, and baked at 250° C. for 10 minutes. There was obtained a transparent tough film with good elongation.

EXAMPLE 29

18.1 g of polymethylene-polyphenylene-polyamine containing 2.5 amino groups on an average per molecule, 3.5 g of hexamethylenediamine, 22.8 g of 4-phenyl trimellitate anhydride and 50 g of cresol were placed in a vessel, and the mixture was heated at a bath temperature of 200° to 220° C. for 3 hours. The by-product water was removed as the xylene azeotrope.

After the reaction, a part of the solution was taken out, and the product was isolated. The inherent viscosity of the product, as measured in N-methylpyrrolidone, was 0.18. As a result of the terminal group determination, the proportion of the terminal amino groups based on the entire end products was 73 mole%. Then, 35 g of the low-molecular-weight polyester obtained in Referential Example 13, 1 g of tetrabutyl titanate and 60 g of cresol were added to the resulting solution, and the mixture was heated at a bath temperature of 180° C. for 1 hour. After the reaction, 50 g of solvent naphtha and 1.1 g of tetrabutyl titanate were added.

The resulting solution was coated on a copper plate with a thickness of 0.3 mm, pre-dried at 150° C. for 30 minutes, and baked at 300° C. for 3 minutes to form a coating with a surface luster.

Even when this copper plate was bended strongly by means of pinchers, and the bended part was rubbed strongly, no crack occurred in the coating.

EXAMPLE 30

198.0 g of butanetetracarboxylic dianhydride, 210.8 g of 4,4'-diaminodiphenylsulfone, 36.3 g of tris(hydroxymethyl) aminomethane and 500 g of cresol were placed in a vessel, and the mixture was heated at a bath temperature of 180° C. for 2 hours. The by-product water was removed as the xylene azeotrope.

Then, the solution obtained in Referential Example 10, and 2.0 g of tetrabutyl titanate were added to this solution, and the mixture was heated at a bath temperature of 180° C. for 1 hour. After the reaction, 18.0 g of tetrabutyl titanate and 750 g of cresol were added.

The resulting solution was coated on a copper plate, pre-dried, and baked at 300° C. for 2 minutes. The resulting coated film was tough and had surface luster. When the film was bended strongly by means of pinchers, and the bended part was rubbed strongly, no crack occurred and the film did not peel off from the copper plate.

EXAMPLE 31

22.3 g of diphenyl terephthalate, 9.5 g of diphenyl isophthalate, 7.8 g of polymethylene-polyphenylene-polyamine containing 2.5 amino groups on an average per molecule, 3.1 g of ethylene glycol, 15.6 g of tris-($\beta$-hydroxyethyl) isocyanurate, 0.2 g of tetrabutyl titanate and 30 g of cresol were placed in a vessel, and the mixture was heated at a bath temperature of 180° C. for 30 minutes. After the reaction, a part of the solution was taken out, and the reaction product was isolated. The inherent viscosity of the product was found to be 0.28.

30 g of the low-molecular-weight polyester obtained in Referential Example 3, 120 g of cresol and 1.0 g of tetrabutyl titanate were added to the resulting solution, and the mixture was heated at a bath temperature of 180° C. for 1 hour. After the reaction, the resulting solution was coated on a glass sheet, pre-dried, and baked at 250° C. for 10 minutes. There was obtained a transparent tough film with good elongation.

EXAMPLE 32

12 g of tris-($\beta$-hydroxyethyl) isocyanurate and 1.0 g of tetrabutyl titanate were added to the solution obtained in Referential Example 20, and the mixture was heated at a bath temperature of 180° C. for 30 minutes. After the reaction, 1.5 g of tetrabutyl titanate and 30 g of solvent naphtha were added.

The resulting solution was coated on a copper plate with a thickness of 0.3 mm, pre-dried at 150° C. for 30 minutes, and baked at 250° C. for 10 minutes. The coating was tough and had surface luster. When it was bended strongly by means of pinchers and the bended part was rubbed strongly, no crack was formed.

The heat softening temperature of the coating on this copper plate was 349° C.

EXAMPLE 33

25.0 g of tris-($\beta$-hydroxyethyl) isocyanurate, 4.5 g of tetramethylene glycol, 3.5 g of tetrabutyl titanate and 150 g of cresol were added to the solution obtained in Referential Example 12, and the mixture was heated at a bath temperature of 180° C. for 1 hour.

The resulting solution was coated on a copper plate with a thickness of 0.3 mm, and baked at 250° C. for 5 minutes. A film having surface luster was obtained. Even when the film was bended strongly by means of pinchers, no cracking occurred at the bended part.

What is claimed is:

1. A heat-curable solvent-soluble ester group containing polymer composition comprising a mixture of (1) a solvent-soluble low molecular weight polyester in which at least 30 mole percent of the entire terminal groups are aryl carboxylate groups modified with a compound containing at least two functional groups selected from the group consisting of (a) a carboxyl group or its functional derivatives, (b) a cyclic carboxylic anhydride group or its precursors, (c) a primary or secondary amino group, (d) an isocyanate group or its stabilized groups or precursors, (e) an aminoacetic group or its functional derivatives, and (f) a hydroxyl group, and (2) a monomeric or solvent-soluble polymeric polyfunctional compound containing at least two reactive groups selected from the group consisting of hydroxyl, primary amino and secondary amino.

2. A heat-curable solvent-soluble ester group containing polymer comprising a partial reaction product formed between (1) a solvent-soluble low molecular weight polyester in which at least 30 mole percent of the entire terminal groups are aryl carboxylate groups modified with a compound containing at least two functional groups selected from the group consisting of (a) a carboxyl group or its functional derivatives, (b) a cyclic carboxylic anhydride group or its precursors, (c) a primary or secondary amino group, (d) an isocyanate group or its stabilized groups or precursors, (e) an aminoacetic group or its functional derivatives, and (f) a hydroxyl group, and (2) a monomeric or solvent-soluble polymeric polyfunctional compound containing at least two reactive groups selected from the group consisting of hydroxyl, primary amino and secondary amino.

* * * * *